US012764081B2

(12) United States Patent
Park et al.

(10) Patent No.: US 12,764,081 B2
(45) Date of Patent: Oct. 13, 2026

(54) ELECTRONIC DEVICE FOR IDENTIFYING IMAGE COMBINED WITH TEXT IN MULTIMEDIA CONTENT AND METHOD THEREOF

(71) Applicant: SAMSUNG ELECTRONICS CO., LTD., Suwon-si (KR)

(72) Inventors: Sangmin Park, Suwon-si (KR); Gajin Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 18/538,649

(22) Filed: Dec. 13, 2023

(65) Prior Publication Data

US 2024/0121206 A1 Apr. 11, 2024

Related U.S. Application Data

(63) Continuation of application No. PCT/KR2023/015272, filed on Oct. 4, 2023.

(30) Foreign Application Priority Data

Oct. 7, 2022 (KR) ........................ 10-2022-0129010
Nov. 2, 2022 (KR) ........................ 10-2022-0144806

(51) Int. Cl.
*H04L 51/10* (2022.01)
*G06F 40/30* (2020.01)
*H04L 51/04* (2022.01)

(52) U.S. Cl.
CPC .............. *H04L 51/10* (2013.01); *G06F 40/30* (2020.01); *H04L 51/04* (2013.01)

(58) Field of Classification Search
CPC ........................................................ G06F 3/05
See application file for complete search history.

(56) References Cited

U.S. PATENT DOCUMENTS 9,721,006 B2 8/2017 Wittmer et al.
9,792,276 B2 10/2017 Eisen
(Continued)

FOREIGN PATENT DOCUMENTS

CN 114090777 A 2/2022
JP 6710007 B1 6/2020
(Continued)

OTHER PUBLICATIONS

International Search Report dated Jan. 25, 2024 in International Application No. PCT/KR2023/015272.
(Continued)

*Primary Examiner* — Chris Parry
*Assistant Examiner* — Abderrahmen Chouat
(74) *Attorney, Agent, or Firm* — Sughrue Mion, PLLC

(57) ABSTRACT

An electronic device includes a speaker; a display; a memory; and a processor operatively connected to the speaker, the display, and the memory. The processor is configured to: identify an input indicating to search a multimedia content stored in the memory, the multimedia content comprising a first text and a plurality of images, the input comprising a third text, generate a second text representing the plurality of images, identify, based on the first text and the second text, a portion of the multimedia content, which is matched to the third text, and output, via at least one of the speaker or the display, the portion of the multimedia content.

20 Claims, 12 Drawing Sheets

(56) References Cited

U.S. PATENT DOCUMENTS

| | | | | |
|---|---|---|---|---|
| 10,446,145 | B2 | 10/2019 | Kim et al. | |
| 11,386,114 | B2 | 7/2022 | Singh et al. | |
| 12,045,278 | B2 | 7/2024 | Barros et al. | |
| 12,124,753 | B2 | 10/2024 | Kim | |
| 2013/0326353 | A1* | 12/2013 | Singhal | G06F 16/683 715/728 |
| 2014/0214428 | A1* | 7/2014 | Katae | G06F 16/685 704/275 |
| 2017/0171285 | A1* | 6/2017 | Shu | G06F 3/0485 |
| 2020/0380199 | A1* | 12/2020 | Judovsky | H04L 51/04 |
| 2021/0192142 | A1 | 6/2021 | Feng et al. | |
| 2022/0164548 | A1 | 5/2022 | Tumuluri | |
| 2022/0179553 | A1 | 6/2022 | Chaudhri et al. | |
| 2023/0199102 | A1* | 6/2023 | Yun | G06F 3/0482 345/902 |

FOREIGN PATENT DOCUMENTS

| | | | |
|---|---|---|---|
| KR | 10-0679394 | B1 | 2/2007 |
| KR | 10-2017-0061923 | A | 6/2017 |
| KR | 10-1947140 | B1 | 2/2019 |
| KR | 10-2088357 | B1 | 3/2020 |
| KR | 10-2109093 | B1 | 5/2020 |
| KR | 10-2020-0097446 | A | 8/2020 |
| KR | 10-2021-0037619 | A | 4/2021 |
| KR | 10-2021-0123119 | A | 10/2021 |
| KR | 10-2022-0020121 | | 2/2022 |
| KR | 10-2435849 | B1 | 8/2022 |

OTHER PUBLICATIONS

Written Opinion dated Jan. 25, 2024 in International Application No. PCT/KR2023/015272.

Nguyen et al., "Multi-Modal and Cross-Modal for Lecture Videos Retrieval", Aug. 28, 2014, 22nd International Conference on Pattern Recognition, pp. 2667-2672 (7 pages total).

Communication dated Apr. 14, 2026, issued by the Korean Patent Office in Korean Patent Application No. 10-2022-0144806.

* cited by examiner

ELECTRONIC DEVICE FOR IDENTIFYING IMAGE COMBINED WITH TEXT IN MULTIMEDIA CONTENT AND METHOD THEREOF

CROSS-REFERENCE TO RELATED APPLICATIONS

This application is a by-pass continuation application of International Application No. PCT/KR2023/015272, filed on Oct. 4, 2023, which is based on and claims priority to Korean Patent Application Nos. 10-2022-0129010, filed on Oct. 7, 2022, and 10-2022-0144806, filed on Nov. 2, 2022, in the Korean Intellectual Property Office, the disclosures of which are incorporated by reference herein their entireties.

BACKGROUND

1. Field

The disclosure relates to an electronic device for identifying an image combined with a text within a multimedia content and a method thereof.

2. Description of the Related Art

An interface between an electronic device and a user may include a keyboard and/or a mouse. In order to support intuitive control of the electronic device, types of the user's actions, which are detectable by the interface between the electronic device and the user, may be increased.

SUMMARY

According to an aspect of the disclosure, an electronic device may include a speaker; a display; a memory; and a processor operatively connected to the speaker, the display, and the memory. The processor may configured to identify an input indicating to search a multimedia content stored in the memory, the multimedia content comprising a first text and a plurality of images, the input comprising a third text. The processor may configured to generate a second text representing the plurality of images. The processor may configured to identify, based on the first text and the second text, a portion of the multimedia content, which is matched to the third text. The processor may configured to output, via at least one of the speaker or the display, the portion of the multimedia content.

According to another aspect of the disclosure, a method of an electronic device, may comprises identifying, an input indicating to search a multimedia content comprising a first sequence of first characters and a plurality of images, the input comprising one or more third characters. The method may comprises identifying, based on a second sequence of second characters, which is obtained by replacing the plurality of images with the second characters representing the plurality of images, a portion of the second sequence matched to the one or more third characters. The method may comprises outputting, the portion of the second sequence of the second characters as a response to the input.

According to another aspect of the disclosure, a method of an electronic device, the method may comprises identifying an input indicating to search a multimedia content stored in a memory of the electronic device, the multimedia content comprising a first text and a plurality of images, the input comprising a third text. The method may comprises identifying, based on the first text and second text representing the plurality of images, a portion of the multimedia content, which is matched to the third text. The method may comprises outputting, via at least one speaker of the electronic device or a display of the electronic device, the portion of the multimedia content.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
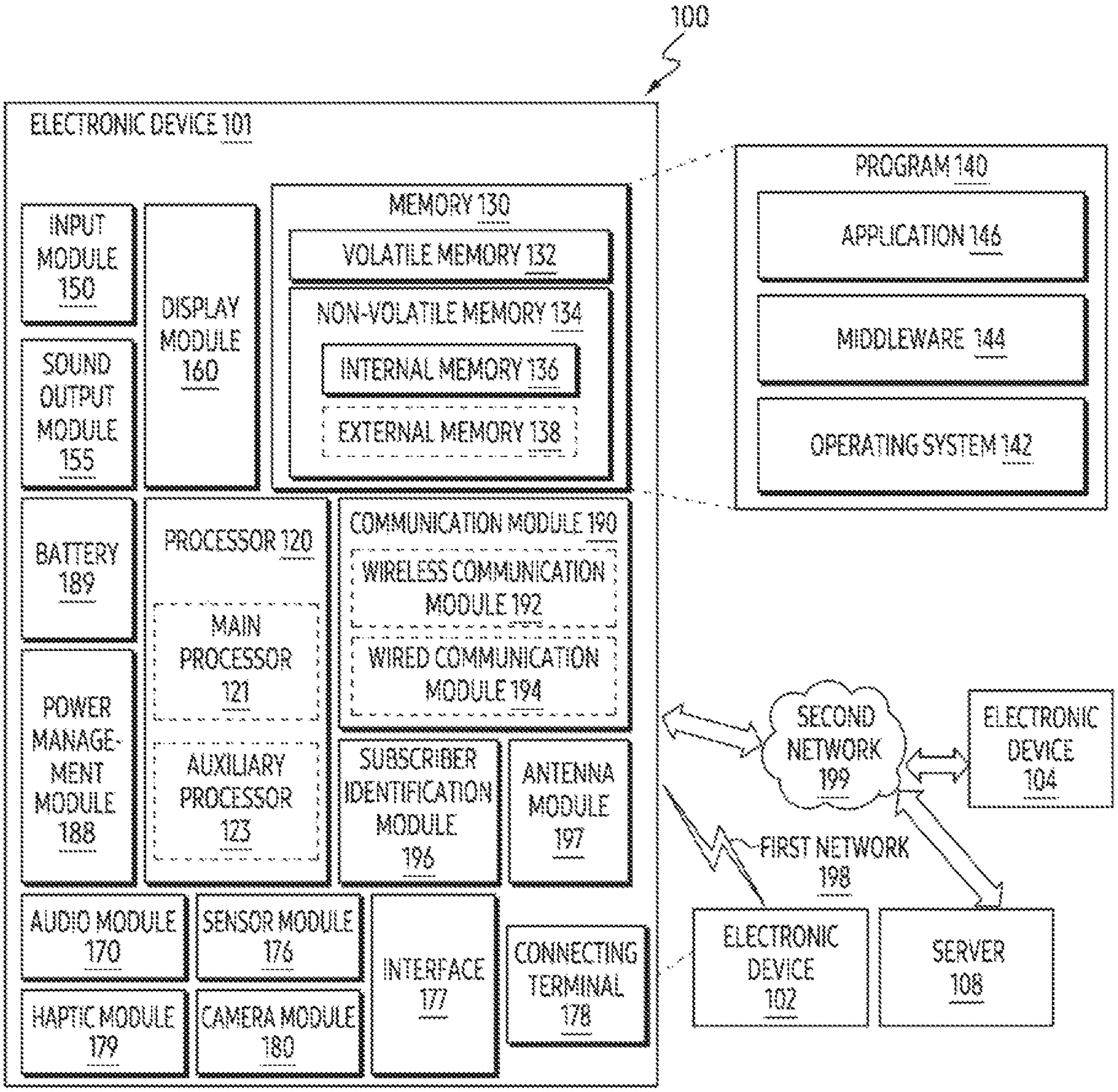
FIG. 1 is a block diagram of an electronic device in a network environment according to an embodiment.

Hereinafter, one or more embodiments of the present document will be described with reference to the accompanying drawings.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
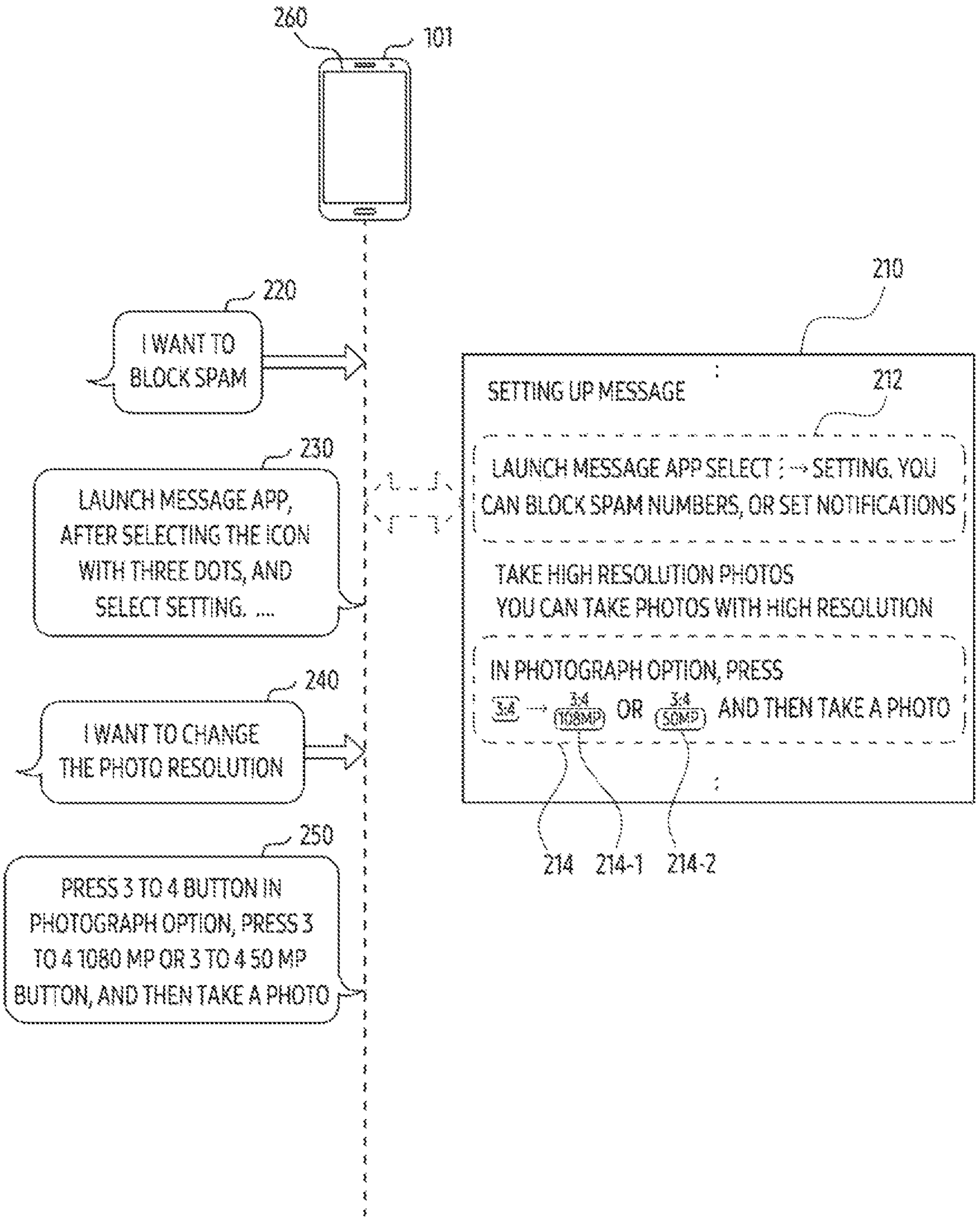
FIG. 2 illustrates an example of an operation performed by an electronic device based on a user's speech according to an embodiment.

FIG. 2 illustrates examples of operations performed by an electronic device based on a user's speech according to an embodiment. The electronic device 101 of FIG. 2 may include the electronic device 101 of FIG. 1. The electronic device 101 may be a terminal owned by a user. The terminal may include, for example, a personal computer (PC) such as a laptop and a desktop, a smartphone, a smart pad, and a tablet PC. The terminal may include smart accessories such as a smartwatch and/or a head-mounted device (HMD).

Information processed by the electronic device 101 may be referred to as a 'multimedia content' 210, which may be a combination of data (e.g., a text) to represent one or more characters and data of different types (e.g., a plurality of images). Hereinafter, a character and/or a text may refer to a 'binary code' stored in the electronic device 101 to display a symbol included in a symbol system for visualizing human language. For example, a binary code corresponding to a character that is a symbol with phonetic value may be generated by encoding the character, according to encoding rules including Unicode, American National Standard Institute (ANSI), and/or American Standard Code for Information Interchange (ASCII). The multimedia content 210 may include one or more characters, a mark different from character (e.g., special character, emoticon, icon), an image (e.g., binary data in GIF and/or PNG format), a video (e.g., binary data in mpeg format), an audio (e.g., binary data in mp3 and/or way format), or a combination thereof.

Referring to FIG. 2, an example of the multimedia content 210 is illustrated. The multimedia content 210 may include documents (e.g., manuals) structured by using a marked-up language such as a web page. The file in which the multimedia content 210 is stored may be based on a format (e.g., hyper-text marked-up language (html), extended marked-up language (xml), open office xml (ooxml), portable document format (pdf), or rich text format (rtf)) related to the multimedia content 210 in the electronic device 101. The file in which the multimedia content 210 is stored may have a file extension (e.g., html, php, asp, jsp, xml, ooxml, pdf, rtf, txt) indicating the format used to store the multimedia content 210. The electronic device 101 may include a display 260 (e.g., the display module 160 in FIG. 1) for visualizing multimedia content 210 and/or one or more speakers (e.g., the sound output module 155 in FIG. 1) for outputting the multimedia content 210 in audio formats. An exemplary structure of the electronic device 101 including a circuit for outputting the multimedia content 210 will be described with reference to FIG. 3.

According to an embodiment, the electronic device 101 may execute one or more functions related to generation, delete, update, search, and/or output of the multimedia content 210. In an embodiment where the electronic device 101 includes the display 260, the electronic device 101 may visualize at least a portion of the multimedia content 210 in the display 260. In an embodiment where the electronic device 101 includes a speaker, the electronic device 101 may output an audio signal representing at least a portion of the multimedia content 210. According to an embodiment, the electronic device 101 may detect user's intention to search for a portion of the multimedia content 210 by interacting with the user. For example, the electronic device 101 may obtain at least one character (e.g., from a keyword) to be used for searching the multimedia content 210 from the user through a keyboard (e.g., a software keyboard displayed through the display 260, and/or a hardware keyboard connected to the electronic device 101). For example, the electronic device 101 may obtain a speech (e.g., speeches 220, 240) requesting the search of the multimedia content 210 from the user through a microphone.

FIG. 2 illustrates exemplary speeches 220 and 240 received by the electronic device 101 from a user. The electronic device 101 may identify the speeches 220 and 240 by converting an audio signal (e.g., speech-to-text (STT), and/or automatic speech recognition (ASR)) outputted from a microphone (e.g., the input module 150 of FIG. 1). The electronic device 101 may identify an input indicating to search the multimedia content 210 from the text within natural languages, which is included in each of the speeches 220 and 240. In terms of the speech for searching the multimedia content 210, each of the speeches 220 and 240 may be referred to as a 'query' (or a natural language query). The electronic device 101 may control at least one of the display 260 or the speaker to output a portion of the multimedia content 210 searched by the input, for example, as a response to the input. According to an embodiment, a structure of application executed by the electronic device 101 to search for the multimedia content 210 based on the speeches 220 and 240 is described in FIGS. 3 to 4.

According to an embodiment, the electronic device 101 may obtain a text corresponding to a non-text (e.g., an image) from the non-text (e.g., an image such as an icon), which is different from the text included in the multimedia content 210. For example, the electronic device 101 may obtain a text including the semantic expression of the non-text included in the multimedia content 210. For example, the electronic device 101 may obtain a text including the meaning of an image within the multimedia content 210 from the image (e.g., an icon) included in the multimedia content 210. The electronic device 101 may obtain a first text included in the multimedia content 210 and a second text corresponding to one or more images included in the multimedia content 210 from the multimedia content 210. The second text may indicate one or more of contextual meanings of the one or more images located in the first text. The contextual meaning and/or semantic expressions of the image may mean an intention and/or a purpose of the person who inserted the image into the text, which may be inferred from the text into which the image is inserted. An operation in which the electronic device 101 obtains the second text including a semantic expression for one or more images included in the multimedia content 210 will be described with reference to FIG. 5.

The electronic device 101 may search for a multimedia content 210 matched to the speech 220, based on an identified input included in speech 220 for searching the multimedia content 210. An operation of searching the multimedia content 210 may include identifying or extracting a portion of the multimedia content 210 including a word of the speech 220. For example, the electronic device 101 may identify a user's intention to search the multimedia content 210 and one or more words (e.g., "spam," "block") that are used to search for the multimedia content 210, from a natural language ("I want to block spam") included within the speech 220. The electronic device 101 may search for the multimedia content 210 to identify a portion 212 including one or more of the words included in the speech 220.

The electronic device 101, which identifies a portion 212 of the multimedia content 210 based on the speech 220, may output the portion 212, for example, via at least one of the display 260 or the speaker. Referring to FIG. 2, an exemplary case in which the electronic device 101 outputs an audio signal, via the speaker, related to the portion 212 is illustrated. An audio signal outputted by the electronic device 101 (for example, in response to the speech 220) may include a speech 230 in which a text included in the portion 212 of the multimedia content 210 and other texts representing one or more images (e.g., special characters such as arrows, icons including three dots) located within the text are combined. The speech 230 may include a natural language (e.g., "Launch messages app, after selecting the icon with three dots, and select Setting. You can block spam numbers, or set notifications, etc.") that may be recognized by a user. For example, the electronic device 101 may output the speech 230 including the natural language obtained by replacing one or more images (included in the portion 212) with a text indicating a meaning of the one or more images within the portion 212. Like the speech 230, the electronic device 101 may prevent the portion 212 from not being completely delivered to the user because at least one image is not included in the speech 230, by outputting a natural language describing at least one image included in the multimedia content 210.

According to an embodiment, the electronic device 101 may use a result of replacing at least one image in the multimedia content 210 with a text for searching the multimedia content 210. Referring to FIG. 2, an exemplary case in which the electronic device 101 identifies the speech 240 from a user is illustrated. The electronic device 101 may identify one or more words (e.g., a photo, a resolution, and/or a change) to be used for searching the multimedia content 210, from natural language included within the speech 240 (e.g., "I want to change the photo resolution."). The electronic device 101 may compare one or more words included in the speech 240 and a text representing at least one image within the multimedia content 210. For example, the electronic device 101 may determine that the portion 214 matches the speech 240, from the image 214-1 included in the portion 214 of the multimedia content 210, by comparing the text representing an image 214-1 (e.g., "3 to 4 1080MP button") and/or the text representing an image 214-2 (e.g., "3 to 4 50MP button") with one or more words identified from the speech 240.

When the portion 214 of the multimedia content 210 matching the speech 240 is identified, the electronic device 101 may convert the identified portion 214 to an audio signal. For example, the electronic device 101 may output, via a speaker, an audio signal including a speech 250 representing the portion 214. The speech 250 may include at least one word describing at least one image (e.g., images 214-1, 214-2) included in the portion 214. Referring to FIG. 2, the electronic device 101 may output, via a speaker, an audio signal including the speech 250 including a natural language sentence (e.g. "Press 3 to 4 button in photograph option, press 3 to 4 1080 MP or 3 to 4 50 MP button, and then take a photo") representing at least one image (e.g., images 214-1, 214-2) included in the portion 214 of the multimedia content 210 based on the text representing the at least one image. Since the electronic device 101 outputs the speech 250 including a semantic expression of images 214-1 and 214-2 within the portion 214 of the multimedia content 210 matching the user's speech 240, the electronic device 101 may completely deliver the meaning of the portion 214 to the user by using a speaker.

Referring to the speeches 230 and 250 outputted by the electronic device 101 and representing each of portions 212 and 214 of the multimedia content 210, the electronic device 101 may change an image (e.g., an arrow) commonly included in the portions 212 and 214 into different texts based on at least one word included in the natural language sentence including the image. For example, the electronic device 101 may change the arrow, which is a special character included in the portion 212, to a word including "choice" within the speech 230 representing the portion 212, based on word (e.g., "choice") in the natural language sentence included within the portion 212. For example, the electronic device 101 may change the arrow, which is a special character included in the portion 214, to a word based on "press", within the speech 250 representing the portion 214, based on words (e.g., "press") in the natural language sentence included within the portion 214. Since the electronic device 101 infers a contextual meaning of the image within portions 212 and 214, an image commonly included in portions 212 and 214 may be changed to a different word within the speeches 230 and 250.

According to an embodiment, the electronic device 101 may identify the text included in the multimedia content 210 and the meaning (e.g., a contextual meaning) of a non-text, such as at least one image (e.g., images 214-1, 214-2) combined with the text, for searching and/or outputting the multimedia content 210. The electronic device 101 may execute functions of searching and/or outputting of the multimedia content 210, based on a combination of the text in the multimedia content 210 and other texts representing the identified meaning.

Hereinafter, referring to FIG. 3, according to an embodiment, an example of hardware and/or software included in the electronic device 101 for searching at least one image included in the multimedia content 210 is described.

Figure 3:
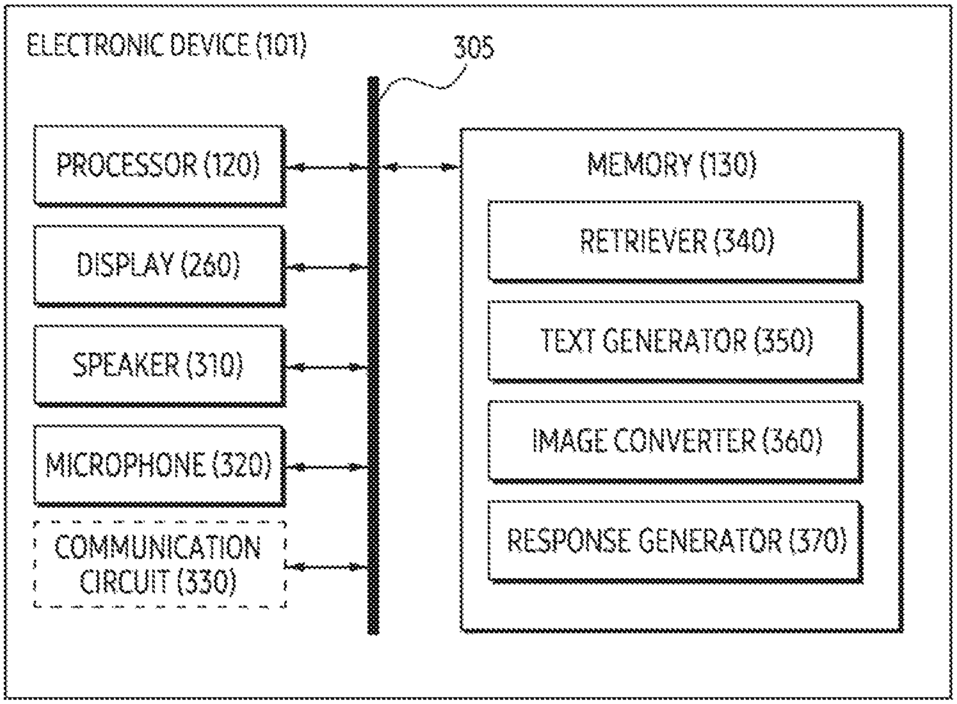
FIG. 3 illustrates a block diagram of an electronic device according to an embodiment.

FIG. 3 illustrates a block diagram of an electronic device 101 according to an embodiment. The electronic device 101 of FIG. 3 may include the electronic device 101 of FIGS. 1 to 2. The electronic device 101 may include at least one of a processor 120, a memory 130, a display 260, a speaker 310, a microphone 320, or a communication circuit 330. The processor 120, the memory 130, the display 260, the speaker 310, the microphone 320, and the communication circuit 330 may be electrically and/or operably coupled with each other by electronic components such as a communication bus 305. Hereinafter, the operational coupling of hardware components may mean that a direct or indirect connection between hardware components is established by wire or wirelessly, so that a second hardware component is controlled by a first hardware component among the hardware components. Although illustrated based on different blocks, embodiments are not limited thereto, and some of the hardware of FIG. 3 (e.g., at least a part of the processor 120, the memory 130, and the communication circuit 330) may be included in a single integrated circuit, such as a system-on-chip (SoC). The types and/or numbers of hardware components included in the electronic device 101 are not limited to those illustrated in FIG. 3. For example, the electronic device 101 may include only some of the hardware illustrated in FIG. 3.

According to an embodiment, the processor 120 of the wearable device 101 may include a hardware component for processing data based on one or more instructions. For example, hardware components for processing data may include an arithmetic and logic unit (ALU), a floating point unit (FPU), a field programmable gate array (FPGA), a central processing unit (CPU), and/or application processor (AP). The number of processors 120 may be one or more. For example, the processor 120 may have a structure of a multi-core processor such as a dual core, a quad core, or a hexa core. The processor 120 of FIG. 3 may include the processor 120 of FIG. 1.

The memory 130 of the electronic device 101 may include a hardware component for storing data and/or instructions inputted and/or outputted to the processor 120. The memory 130 may include, for example, volatile memory such as random-access memory (RAM) and/or non-volatile memory such as read-only memory (ROM). Volatile memory may include, for example, at least one of dynamic RAM (DRAM), static RAM (SRAM), Cache RAM (CRAM), and pseudo SRAM (PSRAM). Nonvolatile memory may include, for example, at least one of a programmable ROM (PROM), an erasable PROM (EPROM), an electrically erasable PROM (EEPROM), a flash memory, a hard disk, a compact disk, a solid state drive (SSD), and an embedded multimedia card (eMMC). The memory 130 of FIG. 3 may include the memory 130 of FIG. 1.

The display 260 of the electronic device 101 may output visualized information (e.g., at least one of the screens of FIGS. 6 to 7) to the user. For example, the display 260 may be controlled by a controller such as a graphic processing unit (GPU) and/or a processor 120 to output visualized information to the user. The display 260 may include a flat panel display (FPD) and/or an electronic paper. The FPD may include a liquid crystal display (LCD), a plasma display panel (PDP), and/or one or more light emitting diodes (LEDs). The LED may include an organic LED (OLED). The display 260 of FIG. 3 may include the display module 160 of FIG. 1.

According to an embodiment, the display 260 of the electronic device 101 may include a sensor (e.g., a touch sensor panel (TSP)) for detecting an external object (e.g., a user's finger) on the display 260. For example, based on TSP, the electronic device 101 may detect an external object contacting with the display 260 or floating on the display 260. In response to detecting the external object, the electronic device 101 may execute a function related to a specific visual object corresponding to a position on the display 260 of the external object among visual objects displayed in the display 260.

The electronic device 101 may include a speaker 310 as an output means for outputting information in a form other than a visualized form. The speaker 310 may include a circuit element vibrated by an audio signal (e.g., audio signals including each of speeches 230 and 250 of FIG. 2) received from the processor 120. The number of speakers 310 included in the electronic device 101 is not limited to an example of FIG. 3, and the electronic device 101 may include one or more speakers. The electronic device 101 may include other output means for outputting information in other forms than visual and auditory forms. For example, the electronic device 101 may include a motor for providing haptic feedback based on vibration.

The microphone 320 of the electronic device 101 may output an electrical signal indicating vibration of the atmosphere. For example, the electronic device 101 may output an audio signal including the user's speech (e.g., speeches 220, 240 of FIG. 2) by using the microphone 320. The user's speech included in the audio signal may be converted into information in a format recognizable by the electronic device 101, based on a speech recognition model and/or natural language understanding model, which are applications and/or processes executed by the processor 120. For example, the electronic device 101 may recognize the user's speech and execute one or more functions of a plurality of functions provided by the electronic device 101. The speaker 310 and/or microphone 320 of FIG. 3 may include the sound output module 155 and/or the audio module 170 of FIG. 1. The microphone 320 of FIG. 3 may include the input module 150 of FIG. 1.

The communication circuit 330 of the electronic device 101 may include hardware to support transmission and/or reception of an electrical signal between the electronic device 101 and an external electronic device (e.g., the electronic device 102, 104 of FIG. 1). The communication circuit 330 may include, for example, at least one of a MODEM, an antenna, and an optic/electronic (O/E) converter. The communication circuit 330 may support transmission and/or reception of an electrical signal, based on various types of protocols such as Ethernet, local area network (LAN), wide area network (WAN), wireless fidelity (Wi-Fi), Bluetooth, Bluetooth low energy (BLE), ZigBee, long term evolution (LTE), and 5G new radio (NR). The communication circuit 330 of FIG. 3 may include a communication module 190 of FIG. 1, a SIM 196, and/or an antenna module 197.

One or more instructions (or commands) indicating calculations and/or operations to be performed by the processor on data may be stored within the memory 130. A set of one or more instructions may be referred to as firmware, operating system (e.g., the operating system 142 in FIG. 1), program, process, routine, sub-routine, and/or application (e.g., the application 146 in FIG. 1). For example, the electronic device 101 and/or the processor 120 may perform at least one of operations of FIGS. 8 to 9, when set of a plurality of instructions distributed in the form of an operating system, firmware, driver, and/or application is executed. Hereinafter, the fact that the application is installed in the electronic device 101 indicates that one or more instructions provided in the form of the application are stored in the memory 130 of the electronic device 101, and mean that one or more of the applications are stored in a format (e.g., a file with an extension specified by operating system of the electronic device 101) executable by the processor 120 of the electronic device 101.

Referring to FIG. 3, a retriever 340, a text generator 350, an image converter 360, and/or a response generator 370 are described as programs executed by the processor 120 of the electronic device 101. For example, a set of a plurality of instructions stored in the memory 130 and/or processes executed by the processor 120 may be divided into the retriever 340, the text generator 350, the image converter 360, and/or the response generator 370. The retriever 340, the text generator 350, the image converter 360, and the response generator 370 may be included in one application installed in the electronic device 101. The application may be executed by the processor 120 of the electronic device 101 to search for multimedia content (e.g., the multimedia content 210 of FIG. 2) in which text and/or images are combined. The multimedia content may be stored in the memory 130, stored in an external electronic device connected through the communication circuit 330, or received from the external electronic device.

The processor 120 of the electronic device 101 may identify an input for searching multimedia content including a combination of the first text and the plurality of images, based on the execution of the retriever 340. The electronic device 101 may identify the input based on detecting a speech (e.g., speeches 220, 240 of FIG. 2) received through the microphone 320. The electronic device 101 may obtain one or more characters to be used for searching multimedia content from the input.

The processor 120 of the electronic device 101 may obtain natural language corresponding to a combination of the first text and/or the plurality of images in the multimedia content based on the execution of the image converter 360. The electronic device 101 may obtain a position of the image within text and/or multimedia content corresponding to the plurality of images, based on a method of obtaining one or more characters from an image, such as optical character recognition (OCR). For example, the electronic device 101 may distinguish the first text and the plurality of images within the multimedia content based on the execution of the image converter 360. For example, the processor 120 of the electronic device 101 may obtain a second text representing the plurality of images, within the multimedia content in which the first text and the plurality of images are combined. The electronic device 101 may obtain the second text by an artificial neural network to infer a meaning of an image, such as language model. Within the combination of the first text and the plurality of images, the processor 120 of the electronic device 101 may replace the plurality of images with the obtained second text.

The processor 120 of the electronic device 101 may search for the one or more characters obtained from the input, within the first text and the obtained second text based on the execution of retriever 340. The electronic device 101 may identify a portion that matches one or more characters (e.g., third text different from the first text and the second text) within the combination of the first text and the second text. The first text and the second text may be combined within the multimedia content, based on a position at which a plurality of images corresponding to the second text are located. The processor 120 of the electronic device 101 may obtain text corresponding to a portion of the combination matching one or more characters based on the execution of the text generator 350. The text may include information for generating an audio signal including speech (e.g., speeches 230, 250 of FIG. 2), such as text to speech (TTS).

The processor 120 of the electronic device 101 may visualize (or may convert to an audio signal) a text generated by the text generator 350 based on the execution of the response generator 370. For example, in a state in which the response generator 370 is executed, the processor 120 may obtain an audio signal transmitted to the speaker 310 and including a speech corresponding to the text. The processor 120 may output the speech based on the vibration of the speaker 310, by transmitting the audio signal to the speaker 310. For example, in a state in which the response generator 370 is executed, the processor 120 may display a visual object related to the text by controlling the display 260. For example, the processor 120 may change at least a portion of the text into an image. For example, the processor 120 may display a portion of multimedia content corresponding to the text in the display 260. Based on the execution of the response generator 370, an example of the visual object displayed by the processor 120 through the display 260 will be described with reference to FIGS. 5 to 7.

According to an embodiment, the electronic device 101 may change at least one image in the multimedia content to search for multimedia content based on text. Based on the change of the at least one image, the electronic device 101 may compare information in which the at least one image is replaced with text within the multimedia content with the text inputted for searching the multimedia content. Within the information, the electronic device 101 may output a portion that matches text inputted for searching the multimedia content through at least one of the speaker 310 or the display 260. The processor 120 of the electronic device 101 may change the at least one image by executing the image converter 360. The processor 120 of the electronic device 101 may output the portion through at least one of the speakers 310 or the display 260, by executing the response generator 370.

Hereinafter, an operation performed by the processor 120 of the electronic device 101 based on executions of the retriever 340, the text generator 350, the image converter 360, and/or the response generator 370 of FIG. 3 will be described in detail with reference to FIG. 4.

Figure 4:
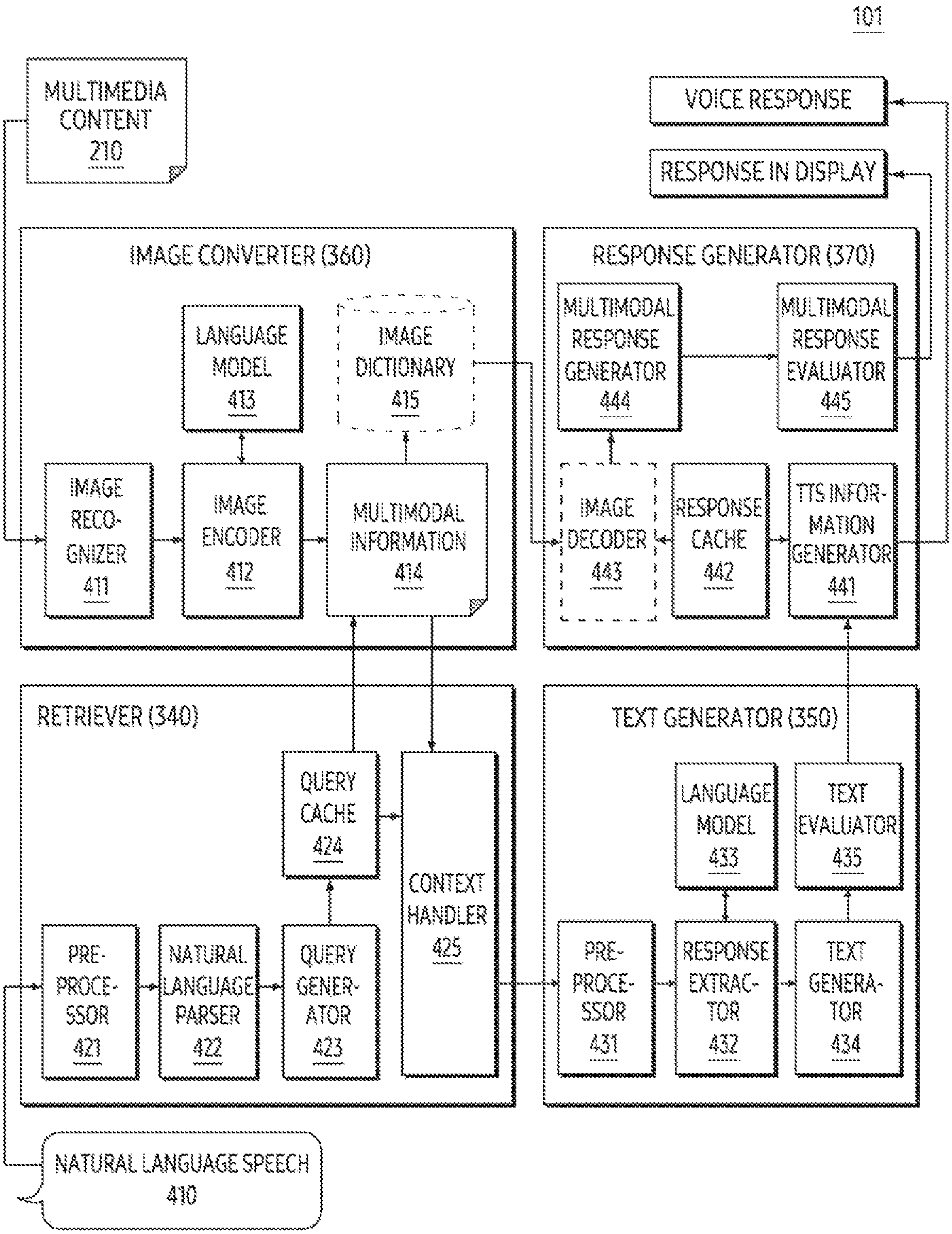
FIG. 4 illustrates operations of a processor of an electronic device, according to an embodiment.

FIG. 4 is an example of a block diagram illustrating operations of a processor of an electronic device 101, according to an embodiment. The electronic device 101 of FIG. 4 may be an example of the electronic device 101 of FIG. 3. For example, the electronic device 101, the retriever 340, the text generator 350, the image converter 360, and the response generator 370 of FIG. 3 may include an electronic device 101, a retriever 340, a text generator 350, an image converter 360, and a response generator 370 of FIG. 4.

According to an embodiment, the processor (e.g., the processor 120 of FIG. 2) of the electronic device 101 may recognize the multimedia content 210 based on the execution of the image converter 360. Recognizing the multimedia content 210 may include obtaining text corresponding to non-verbal (non-text) data (e.g., an image) included in the multimedia content 210. The non-verbal (non-text) data may include an image. An image included in the multimedia content 210 is information within the multimedia content 210 distinguished from a character and/or text to which a phonetic value is assigned, and may include information having a format (e.g., format of GIF, PNG, and/or JPEG) to indicate colors of pixels arranged in two dimensions. The image included in the multimedia content 210 may include a special character such as an exclamation mark (!) and/or a question mark (?). The special character may be stored in a format of a code based on text within the multimedia content 210. For example, within the multimedia content 210 in HTML format, code '& #64: may indicate special character'@'. Referring to FIG. 4, instructions and/or sub-routines included in the image converter 360 for recognizing the multimedia content 210 may be divided into an image recognizer 411, an image encoder 412, and a language model 413. Based on the execution of the image converter 360, the electronic device 101 may obtain multimodal information 414, and/or an image dictionary 415 including a result of recognizing the multimedia content 210.

Based on the execution of the image recognizer 411, the electronic device 101 may identify at least one image included in the multimedia content 210. For example, the electronic device 101 may identify a position of at least one image included in the multimedia content 210 within the first text included in the multimedia content 210. For example, the electronic device 101 may identify a position where at least one image is located within a first sequence of characters included in the first text.

Based on the execution of the image encoder 412, the electronic device 101 may represent at least one image included in the multimedia content 210 and obtain a second text different from the first text included in the multimedia content 210. Based on a position of at least one image for the first text of the multimedia content 210 identified by the image recorder 411, the electronic device 101 may identify at least one character connected to at least one image. Based on the at least one character, the electronic device 101 may infer a meaning of the at least one image within the first text. Based on the execution of the language model 413, the electronic device 101 may infer a meaning of the at least one image within the first text. Based on the execution of the image encoder 412, the electronic device 101 may obtain a second text from the at least one image based on a rule of the first text included in the multimedia content 210. For example, the electronic device 101 may obtain the second text representing the at least one image, for example, by using a style applied to the first text, such as bold, italic, and/or underline. The second text representing at least one image may indicate a (contextual) meaning of the at least one image within the first text of the multimedia content 210. For example, the second text may include at least one word and/or one phrase corresponding to the at least one image. For example, the electronic device 101 may obtain the second text based on at least one character corresponding to at least one image within the first text.

A language model 413 included in the image converter 360 is a recognition model implemented by software or hardware that mimics computation power of a biological system using artificial neurons (or nodes). The electronic device 101 may infer a meaning of at least one image included in the multimedia content 210 by executing the language model 413. The language model 413 may include a plurality of nodes connected by an architecture such as recurrent neural network (RNN), bidirectional encoder representations from transformers (BERT), and/or generative pre-trained transformer (GPT) (e.g., GPT-3). For example, the language model 413 may include weights assigned to a connection between the plurality of nodes. The weights may be numeric values tuned by a training process by supervised learning and/or unsupervised learning.

Based on the execution of the image encoder 412, the electronic device 101 may obtain multimodal information 414 from the multimedia content 210. The multimodal information 414 may be obtained by replacing the at least one image with the second text, among the first text of the multimedia content 210 and at least one image coupled within the first text. For example, the multimodal information 414 may include a second sequence in which the at least one image is replaced with the second text, corresponding to the first sequence of the first text and the at least one image included in the multimedia content 210. For example, the multimodal information 414 may include a second sequence obtained by replacing the at least one image with the second text, in the first sequence that is a combination of, or that includes, the first text and the at least one image. In the second sequence, the first text and the second text included in the multimedia content 210 may be combined or included based on the position of the at least one image in the first text. The embodiment is not limited thereto, and the multimodal information 414 may include an implicit representation for the meaning of the at least one image in the first text. Based on the execution of the image encoder 412, the electronic device 101 may generate multimodal information 414 including the implicit representation by integrally encoding the first text and the at least one image in the multimedia content 210. The multimodal information 414 including the implicit representation may represent the second sequence based on the numeric values in multidimensional matrix, such as a tensor. Information indicating a position of at least one image in the multimedia content 210 may be used for generating multimodal information 414. An example of the multimodal information 414 generated by the electronic device 101 from the multimedia content 210 is described with reference to FIG. 5.

Based on the execution of the image converter 360, the electronic device 101 may obtain an image dictionary 415 for the multimedia content 210. The image dictionary 415 may include an image included in the multimedia content 210 and a pair of text representing the image. For example, the electronic device 101 may obtain the image dictionary 415 by matching the second text included in the multimedia information 414 and at least one image included in the multimedia content 210. For example, the image dictionary 415 may include explicit information on at least one image included in the multimedia content 210.

Based on the execution of the retriever 340, the electronic device 101 may identify an input indicating to search the multimedia content 210 from the speech 410 (e.g., speeches 220, 240 in FIG. 2). The electronic device 101 may identify the speech 410 from an audio signal received through a microphone (e.g., the microphone 320 of FIG. 3). For example, the speech 410 may include information indicating a text obtained from the audio signal. The electronic device 101 may identify the user's intention to search the multimedia content 210 and the third text to be used for the search for the multimedia content 210, from the natural language included in the speech 410. That is, the input includes the third text. Referring to FIG. 4, instructions and/or sub-routines included in the retriever 340 for processing speech 410 may be divided into a pre-processor 421, a natural language parser 422, a query generator 423, a query cache 424, and/or a context handler 425.

Based on the execution of the pre-processor 421, the electronic device 101 may perform pre-processing on the text included in the speech 410. The preprocessing may include an operation of additionally obtaining information corresponding to the text for natural language processing, such as tokenization. Based on the execution of the natural language parser 422, the electronic device 101 may identify the user's intention for searching the multimedia content 210 from the speech 410. Based on the execution of the query generator 423, the electronic device 101 may generate a query for searching the multimodal information 414. The query generated based on the execution of the query generator 423 may refer to a structured text for searching the multimodal information 414. Based on the execution of the query cache 424, the electronic device 101 may identify whether the query generated by the query generator 423 has occurred repeatedly. When the query is not repeatedly generated, the electronic device 101 may search the multimodal information 414 based on the query. When the query is repeatedly generated, the electronic device 101 may obtain a search result of the multimodal information 414 by the query, based on the execution of the context handler 425. For example, based on the execution of the context handler 425, the electronic device 101 may manage the search result of the multimodal information 414. Based on the execution of the context handler 425, the electronic device 101 may obtain a portion of the multimodal information 414 that matches the query generated by the query generator 423. When the multimodal information 414 includes an implicit representation on a combination of the first text included in the multimedia content 210 and the at least one image, the electronic device 101 may obtain an implicit representation indicating a portion of the multimedia content 210 matching the query, based on the execution of the context handler 425. The implicit representation obtained based on the execution of the context handler 425 may be referred to as 'context information.'

Based on the execution of the text generator 350, the electronic device 101 may obtain a text from information (e.g., context information) obtained from the multimodal information 414 using the context handler 425. The text obtained by the execution of the text generator 350 may be related to at least a portion of the multimedia content 210. The text may include a response of the electronic device 101 for an input identified by the speech 410 and indicating to search the multimedia content 210. Referring to FIG. 4, instructions and/or sub-routines included in the text generator 350 may be divided into a pre-processor 431, a response extractor 432, a language model 433, a text generator 434, and/or a text evaluator 435.

Based on the execution of the pre-processor 431, the electronic device 101 may perform pre-processing on information (e.g., context information) obtained by using the context handler 425. The pre-processing may include obtaining at least one character and/or at least one word from information implicitly used for natural language processing, such as detokenization. Based on the execution of the response extractor 432, the electronic device 101 may extract a portion to be used as a response of the electronic device 101 from information changed by the pre-processor 431. In order to extract the portion, the electronic device 101 may execute the language model 433. The language model 433 may match the language model 413, according to an embodiment. Based on the execution of text generator 434, the electronic device 101 may obtain a text from information extracted using the response extractor 432. Based on the execution of the text evaluator 435, the electronic device 101 may evaluate an appropriate degree of the obtained text as a response to the speech 410. For example, the electronic device 101 may infer a probability that the text is recognized as a natural language sentence and/or a probability that the text is recognized as a response to the speech 410. Based on the probability, the electronic device 101 may determine whether to process the text and/or change the text, by using the response generator 370.

Based on the execution of the response generator 370, the electronic device 101 may obtain information that may be outputted through hardware (e.g., the display 260 and/or speaker 310) of the electronic device 101, from text generated by the text generator 350. The electronic device 101 may obtain an audio signal to be transmitted to a speaker from the text, in a state that the response generator 370 is executed. The electronic device 101 may obtain information for displaying a visual object including the text, in a state that the response generator 370 is executed. Referring to FIG. 4, instructions and/or sub-routines included in the response generator 370 may be divided into a text-to-speech (TTS) information generator 441, a response cache 442, an image decoder 443, a multimodal response generator 444, and/or a multimodal response evaluator 445.

Based on the execution of the TTS information generator 441, the electronic device 101 may generate an audio signal (e.g., a voice response) including text generated by using the text generator 350. The audio signal may be outputted through a speaker of the electronic device 101. The text processed by the TTS information generator 441 may be stored in the electronic device 101 based on the execution of the response cache 442. Based on the execution of the response cache 442, the electronic device 101 may identify whether the text matches other text stored in the electronic device 101. When the text processed by TTS information generator 441 matches other text stored in the electronic device 101, the electronic device 101 may bypass an execution of the image decoder 443 and/or an execution of the multimodal response generator 444, and may output a result of visualizing the other text through the display.

Based on the execution of the image decoder 443 and/or the execution of the multimodal response generator 444, the electronic device 101 may obtain information combined with a text and/or at least one image from the text stored by the response cache 442. For example, based on the execution of the image decoder 443, the electronic device 101 may identify an image corresponding to at least a portion of the text stored in the response cache 442 from the pair included in the image dictionary 415.

Based on the execution of the multimodal response generator 444, the electronic device 101 may obtain (a combination of) at least one character and/or at least one image, from the text stored in the response cache 442. In one embodiment, the combination may have a form similar to at least a portion of the multimedia content 210 including a combination of the first text and at least one image. In a state in which the multimodal response generator 444 is executed, the electronic device 101 may change at least a portion of the text, based on a document object model (DOM) and/or a simple API for XML (SAX). Based on the execution of the multimodal response generator 444, the electronic device 101 may obtain multimedia content representing the text generated using the text generator 350.

Based on the execution of the multimodal response evaluator 445, the electronic device 101 may evaluate a degree in which information (e.g., multimedia content for text generated using the text generator 350) obtained by the multimodal response generator 444 is appropriate as a response to the speech 410. For example, when the information is displayed through a display, the electronic device 101 may infer a probability that the information is recognized as a response to the speech 410. Based on the probability, the electronic device 101 may determine whether to display the information in the display and/or change the information.

According to an embodiment, the electronic device 101 may search the multimodal information 414 corresponding to the multimedia content 210, for example, in response to the speech 410 for searching the multimedia content 210. Since the multimodal information 414 includes semantic expression for at least one image included in the multimedia content 210, the electronic device 101 may use the at least one image to search for the multimedia content 210 based on the speech 410. Since at least one image in the multimedia content 210 is used to search for the multimedia content 210, the electronic device 101 may improve accuracy of a result of searching the multimedia content 210 based on the speech 410.

Hereinafter, referring to FIG. 5, according to an embodiment, an example of the multimodal information 414 obtained by the electronic device 101 from the multimedia content 210 will be described.

Figure 5:
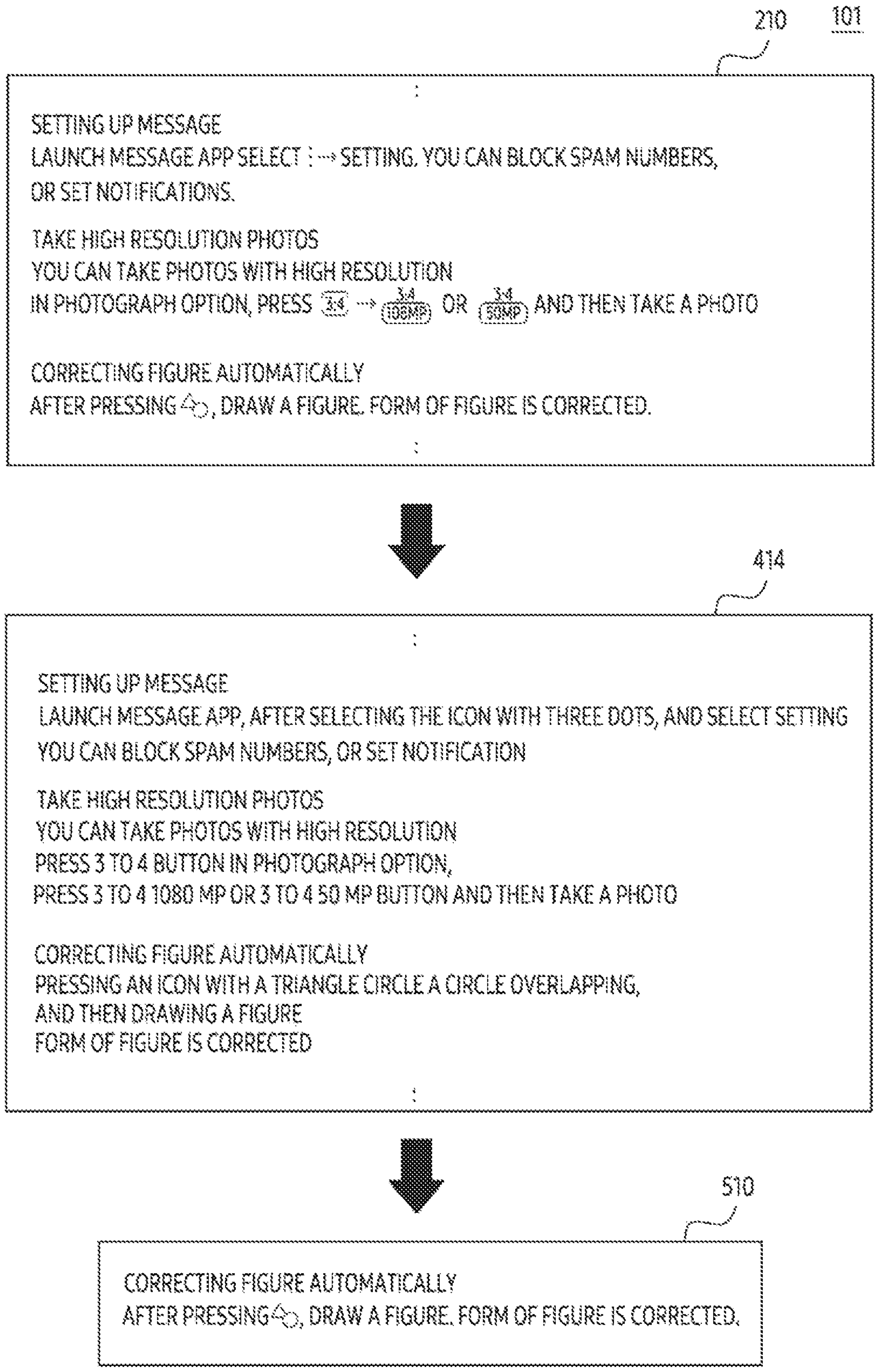
FIG. 5 illustrates an example of multimodal information obtained by an electronic device by converting at least one image in a multimedia content, according to an embodiment.

FIG. 5 illustrates an example of multimodal information 414 obtained by an electronic device 101 by converting at least one image in the multimedia content 210, according to an embodiment. The electronic device 101 of FIG. 5 may be an example of the electronic device 101 of FIGS. 3 to 4.

Referring to FIG. 5, an example of the multimedia content 210 including first characters and a first sequence of a plurality of images is illustrated. The multimedia content 210 may be stored in the memory (e.g., the memory 130 in FIG. 3) of the electronic device 101, or may be transmitted to the electronic device 101 through a communication circuit (e.g., the communication circuit 330 in FIG. 3). The electronic device 101 may identify an input indicating to search the multimedia content 210. The input may be identified based on a microphone (e.g., the microphone 320 of FIG. 3) of the electronic device 101, or keywords inputted through a software keyboard (or hardware keyboard connected to the electronic device 101) displayed through a display (e.g., the display 260 of FIGS. 2 to 3) of the electronic device 101.

In one embodiment, for example, in response to an input indicating to search the multimedia content 210, the electronic device 101 may obtain a second sequence within the first sequence in the multimedia content 210 by replacing the plurality of images with second characters representing the plurality of images. The second characters may be identified based on at least one character corresponding to each of the plurality of images, among the first characters. For example, the second characters may indicate a word and/or a phrase indicating a semantic expression that the plurality of images have in the first sequence, based on the at least one character corresponding to each of the plurality of images. The electronic device 101 may obtain the multimodal information 414, which represents implicitly or explicitly the second sequence, by executing the image converter 360 of FIG. 4.

Referring to FIG. 4, the multimodal information 414 obtained by replacing at least one image included in the multimedia content 210 with a text, may include a sequence (e.g., the second sequence) of one or more characters. The multimodal information 414 may include a text replacing at least one image included in the multimedia content 210. For example, a special character such as an arrow included in the multimedia content 210 may be replaced with verbs such as 'select,' and/or 'press' within the multimodal information 414. For example, the electronic device 101 may replace an icon included in the multimedia content 210 with text describing the icon, such as "icon with a triangle a circle overlapping" in the multimodal information 414. According to an embodiment, the electronic device 101 may identify a portion matching one or more third characters included in an input indicating to search the multimedia content 210 from the second sequence included in the multimodal information 414.

Referring to FIG. 5, an example of a visual object 510 displayed by the electronic device 101 in response to a natural language (e.g., "How do I draw a figure?") or a word (or a keyword) (e.g., "draw a figure") for searching a portion of the multimedia content 210 is illustrated. The visual object 510 may be displayed based on the execution of the response generator 370 of FIG. 4. In one embodiment, for example, in response to the input, the electronic device 101 may obtain a portion corresponding to one or more third characters included in the input from the second sequence included in the multimodal information 414 by searching for multimodal information 414. The portion obtained through the multimodal information 414 may include semantic expression of at least one image included in a portion matching the one or more third characters in the multimedia content 210. The visual object 510 may be obtained by replacing one or more characters with an image, within a portion of the second sequence of the multimodal information 414. For example, the electronic device 101 may extract a text (e.g., "correcting figure automatically after pressing an icon with a triangle circle a circle overlapping draw a figure") within the multimodal information 414 based on the input. The electronic device 101 may output the text extracted from the second sequence in a form of the speech using a speaker. Within the extracted text, the electronic device 101 may replace the text corresponding to the image (e.g., "icon with a triangle a circle overlapping") with an image to generate information for displaying the visual object 510. The electronic device 101 may display the visual object 510 based on the information in the display. Referring to FIG. 5, in the visual object 510, at least a portion of the text within the multimodal information 414 may be replaced with an image and displayed.

According to an embodiment, the electronic device 101 may obtain the multimodal information 414 to be used for searching the multimedia content 210. In the multimodal information 414, at least one image included in the multimedia content 210 may be replaced with a text. The electronic device 101 may search the multimodal information 414 in response to an input indicating to search the multimedia content 210. The electronic device 101 may search a contextual meaning of at least one image in the multimedia content 210. In a state of visualizing a portion of the multimodal information 414 selected by the input, the electronic device 101 may provide a user experience similar to that of being displayed a portion of the multimedia content 210, by replacing the text corresponding to the image in the multimedia content 210 within the portion with the image again.

Although the operation of the electronic device 101 has been described based on the multimedia content 210 in a document format, the embodiment is not limited thereto. Hereinafter, an example of an operation in which the electronic device 101 recognizes an image included in multimedia content including a message log managed by a messenger application will be described with reference to FIGS. 6 to 7.

Figure 6:
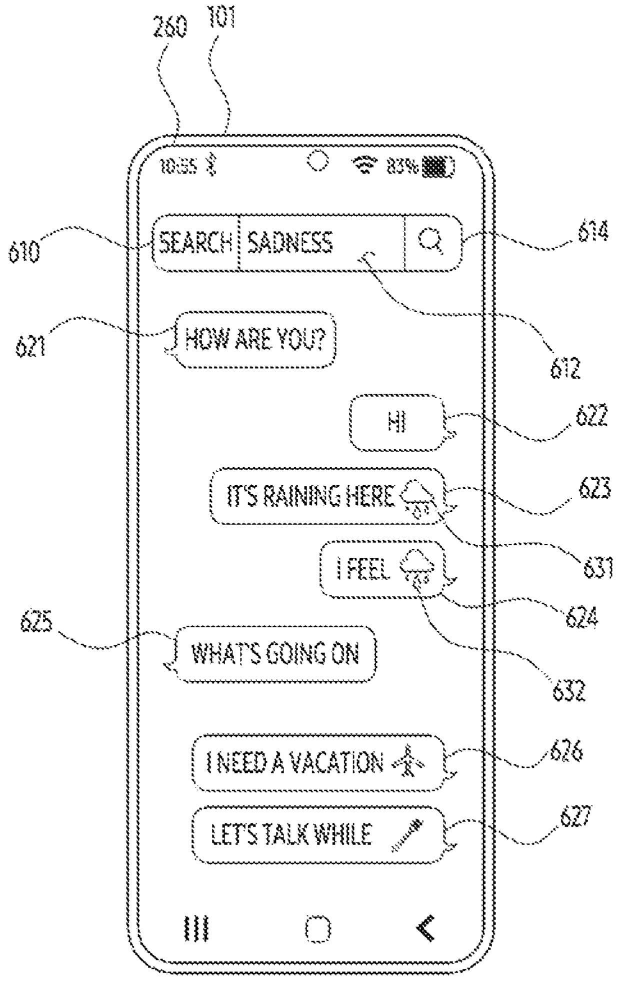
FIG. 6 illustrates an example of an operation in which an electronic device searches for at least one image included in text, according to an embodiment.

FIG. 6 illustrates an example of an operation in which an electronic device 101 searches for at least one image included in text, according to an embodiment. The electronic device 101 of FIG. 6 may be an example of the electronic device 101 of FIGS. 3 to 4. For example, the electronic device 101 and the display 260 of FIG. 3 may include the electronic device 101 and the display 260 of FIG. 6. Referring to FIG. 6, a screen displayed by the electronic device 101 through the display 260 is illustrated. Hereinafter, the screen may refer to a user interface (UI) displayed within at least a portion of the display. The screen may include, for example, an activity of Android™ operating system. In an exemplary state of FIG. 6, the electronic device 101 may display a screen provided from the messenger application in the display 260.

Referring to FIG. 6, based on the execution of the messenger application, the electronic device 101 may display a list of messages (e.g., messages 621, 622, 623, 624, 625, 626, 627) electronically exchanged between at least two users in the display 260. The at least two users may include a user of the electronic device 101. Messages 621, 622, 623, 624, 625, 626, and 627 may be displayed in a visual object in a form of a bubble in the display 260. Referring to FIG. 6, the electronic device 101 may transmit or receive a message including a text and/or an image (e.g., emoticon) based on the execution of the messenger application. The message may be referred to as multimedia content in terms of including an image such as an emoticon. The list displayed in the display 260 may correspond to at least a portion of log information stored in the electronic device 101, and/or an external electronic device (e.g., a server related to the messenger application) connected to the electronic device 101.

According to an embodiment, the electronic device 101 may identify an input indicating to search a message included in the list. The electronic device 101 may receive the input through a visual object 610 displayed in the display 260. The visual object 610 may include a button 614 for initiating a search based on a text box 612 for receiving one or more characters, and one or more characters inputted in the text box 612. Referring to FIG. 6, an exemplary case in which an electronic device 101 identifies an input for searching a word "sadness" through the visual object 610 is illustrated. In one embodiment, for example, in response to a gesture of touching and/or clicking the button 614, the electronic device 101 may search at least one message including the word "sadness" in the list.

According to an embodiment, the electronic device 101 may search a message that is a multimedia content and/or a list of the messages (e.g., messages 621, 622, 623, 624, 625, 626, 627) based on the above-described operation with reference to FIGS. 2 to 4. For example, the electronic device 101 may change an image 631, which has a form of rain, into a text representing the image 631, in the message 623. For example, in the message 623, the electronic device 101 may identify contextual meaning of the image 631, based on text combined with the image 631 (e.g., "It's raining here"). For example, in the message 623, the electronic device 101 may identify that the image 631 represents weather phenomenon (e.g., rain).

Since the electronic device 101 identifies a contextual meaning of an image, the same form of images included in different messages may be recognized as different texts. Referring to FIG. 6, messages 623 and 624 may include images 631 and 632 of the same form. For example, the electronic device 101 identifying that the image 631 included in the message 623 represents weather phenomenon may identify that the image 632 represents an emotion (e.g., sadness), based on natural language (e.g., "I'm sad too") corresponding to the image 632, in the message 624. In the example, the electronic device 101 may replace images 631 and 632 with different texts based on different contextual meanings of the images 631 and 632, independently of all images 631 and 632 having the same form. For example, the electronic device 101 may obtain a text representing weather phenomena (e.g., "image of rain") from the images 631 used to represent weather phenomena, and obtain a text representing an emotion (e.g., "image representing sadness using rain") from the image 632 used to represent the emotion.

A result of changing the images 631 and 632 to the text may be used to search for a message. The electronic device 101 may compare one or more characters received through the text box 612 with text included in at least one message (e.g., messages 621, 622, 623, 624, 625, 626, 627) included in list and the text obtained from the images 631 and 632. Referring to FIG. 6, although the text included in the message 624 ("my feeling") does not include word "sadness" received through the text box 612, since the text obtained from the image 632 (e.g., "image representing sadness using rain") matches the word "sadness", the electronic device 101 may determine the message 624 as a message matching the word "sadness" received through the text box 612.

Referring to FIG. 6, the electronic device 101 may emphasize the message 624, which matches the word "sadness" received through the text box 612, more than other messages (e.g., messages 621, 622, 623, 625, 626, 627) displayed in the display 260. The electronic device 101 may visualize that the message 624 is a result of searching for a message included in the list, by emphasizing the message 624. Emphasizing the message 624 by the electronic device 101 may include at least one of scrolling the message 624 and/or the list including the message 624 toward a designated position in the display 260 (e.g., center of the display 260), changing a color of the message 624 to a color different from other messages, increasing the size of message 624, displaying a visual object related to the message 624, or playing an exclusive animation for the message 624.

An operation of extraction of contextual meaning of an image by the electronic device 101 is not limited to searching for text and/or multimedia content including the image. Hereinafter, according to an embodiment, an example of an operation in which the electronic device 101 executes a TTS function on at least a portion of multimedia content will be described with reference to FIG. 7.

Figure 7:
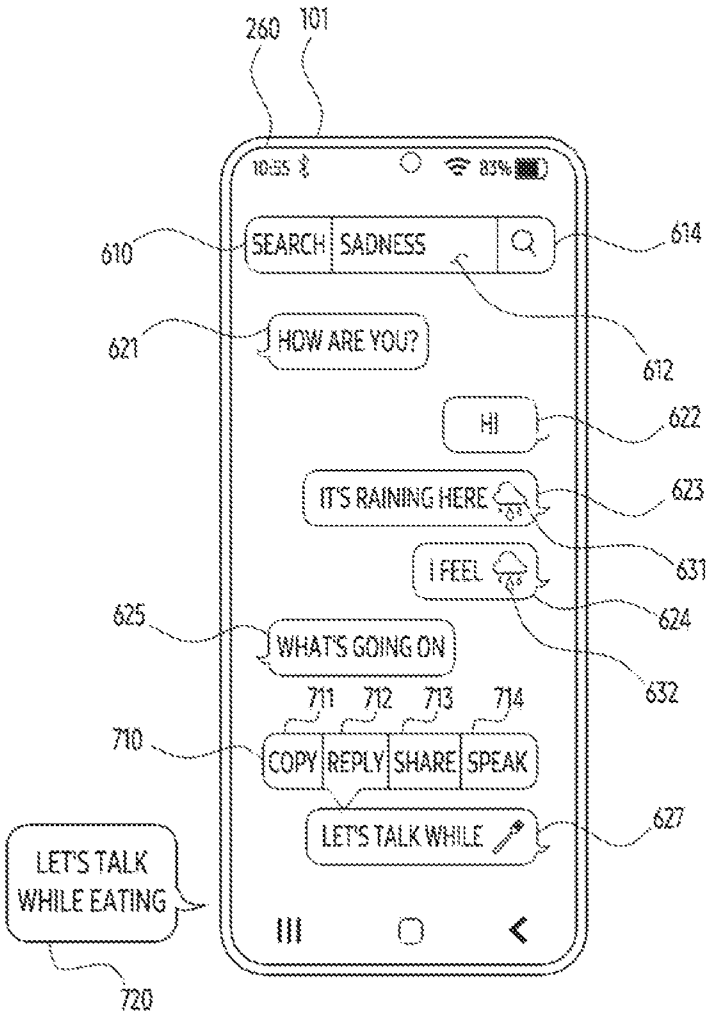
FIG. 7 illustrates an example of an operation in which an electronic device outputs an audio signal including a speech representing at least one image included in text, according to an embodiment.

FIG. 7 illustrates an example of an operation in which an electronic device outputs an audio signal including a speech 720 representing at least one image included in a text, according to an embodiment. The electronic device 101 of FIG. 7 may be an example of the electronic device 101 of FIGS. 3 to 4. For example, the electronic device 101 and the display 260 of FIG. 3 may include the electronic device 101 and the display 260 of FIG. 7. Referring to FIG. 7, an exemplary state in which the electronic device 101 displays a screen in the display 260 based on the execution of the messenger application is illustrated. In the screen of FIG. 7, the electronic device 101 may display a list of messages (e.g., messages 621, 622, 623, 624, 625, 626, 627) exchanged by the messenger application.

The electronic device 101 may identify an input for outputting an audio signal for a message included in the list. The electronic device 101 may display a menu 710 including functions executable by using the message 627, based on a gesture of touching the message 627 beyond a designated period (e.g., 0.5 seconds). In the menu 710, the electronic device 101 may display the option 711 indicating a function of copying a combination of text and/or images included in the message 627. In the menu 710, the electronic device 101 may display the option 712 indicating a function of transmitting a reply to the message 627. In the menu 710, the electronic device 101 may display the option 713 indicating a function of sharing the combination of text and/or images included in the message 627 to other applications (e.g., email applications) different from messenger applications. In the menu 710, the electronic device 101 may display the option 714 indicating a function for outputting an audio signal corresponding to the combination of text and/or images included in the message 627.

In response to an input indicating to select the option 714 in the menu 710, the electronic device 101 may output an audio signal corresponding to message 627 corresponding to menu 710. Referring to FIG. 7, the electronic device 101 may identify a text (e.g., "Let's talk while") and an image (e.g., fork-shaped icon) included in the message 627. The electronic device 101 may identify a word representing the image based on a combination of the text and the image included in the message 627. For example, the electronic device 101 may infer that an image included in the message 627 is selected to describe a specific action (e.g., eating) for conversation. In the example, the electronic device 101 may output a speech 720 (e.g., "Let's talk while eating") including semantic expression of the image included in the message 627 in a form of an audio signal. Like the speech 720, the electronic device 101 may output text representing an image included in the message 627 together with text included in the message 627.

According to an embodiment, the electronic device 101 may identify intention of a user embedding an image in the text. Based on the intention, the electronic device 101 may obtain a second sequence of second text to replace the first text and the image, from the first sequence of the first text and the image. The electronic device 101 may perform a function for searching multimedia content including the first sequence based on the second sequence.

Hereinafter, an operation of the electronic device 101 according to an embodiment will be described with reference to FIGS. 8 to 9.

Figure 8:
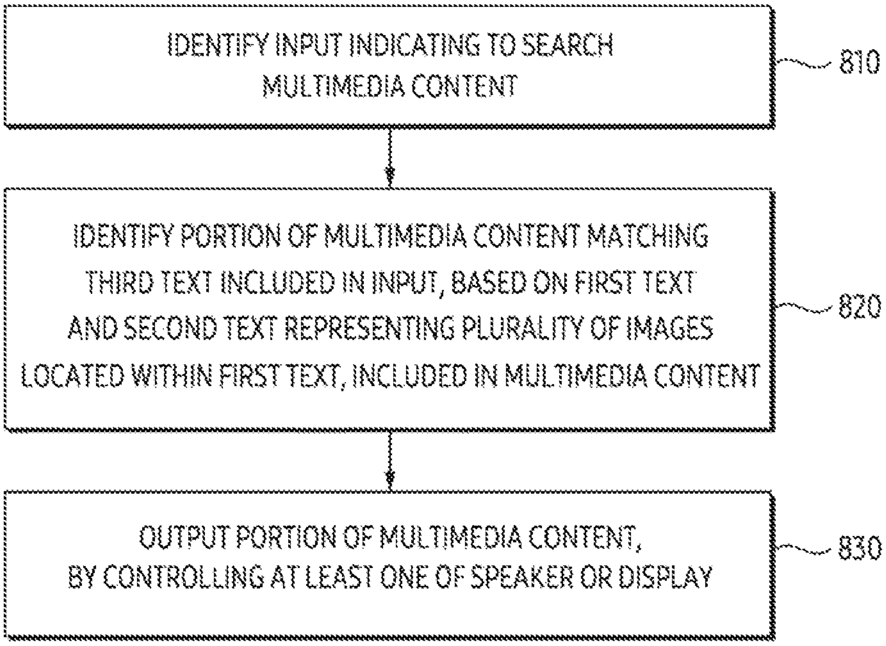
FIG. 8 illustrates an example of a flowchart for describing an operation performed by an electronic device, according to an embodiment.

FIG. 8 illustrates an example of a flowchart for describing an operation performed by an electronic device, according to an embodiment. The electronic device of FIG. 8 may include the electronic device 101 of FIGS. 1 to 7. The operations of FIG. 8 may be performed by the electronic device 101 of FIGS. 3 to 4 and/or the processor 120 of FIG. 3. In the following embodiment, each operation may be performed sequentially, but is not necessarily performed sequentially. For example, the order of each operation may be changed, and at least two operations may be performed in parallel.

Referring to FIG. 8, in operation 810, according to an embodiment, the electronic device may identify an input indicating to search a multimedia content. The multimedia content of operation 810 may include the multimedia content 210 of FIGS. 2 and/or FIGS. 3 to 5. The multimedia content of operation 810 may include messages 621, 622, 623, 624, 625, 626, and 627 and/or log information of the messages. The input of operation 810 may be identified by user's speech (e.g., speeches 220, 240 in FIG. 2) received through a microphone (e.g., the microphone 320 of FIG. 3) of the electronic device. The electronic device 101 may identify the input by processing the speech received through the microphone based on the execution of the retriever 340 of FIGS. 3 to 4. The embodiment is not limited thereto, and the input of operation 810 may be identified based on the visual object 610 of FIG. 6.

Referring to FIG. 8, in operation 820, according to an embodiment, the electronic device may identify a portion of multimedia content matching the third text included in the input, based on the first text and the second text representing a plurality of images located within the first text, included in the multimedia content. The second text may include semantic expressions of each of the plurality of images, identified by positions in the first text in which the plurality of images are located. The combination of the first text and the second text may be related to the multimodal information 414 of FIG. 4. The electronic device 101 may obtain information (e.g., the multimodal information 414 of FIG. 4) used for searching the third text, by replacing the plurality of images with the second text within the multimedia content.

Referring to FIG. 8, in operation 830, according to an embodiment, the electronic device may output a portion of the multimedia content identified by operation 820, for example, by controlling or via, at least one of the speaker or the display. For example, the electronic device 101 may output an audio signal including a speech (e.g., the speeches 230, 250 of FIG. 2) that represents the portion of the multimedia content, for example, by controlling the speaker (e.g., the speaker 310 of FIG. 3). For example, the electronic device 101 may display a visual object related to the portion of the multimedia content in the display (e.g., the display 260 of FIG. 3), such as the visual object 510 of FIG. 5.

Figure 9:
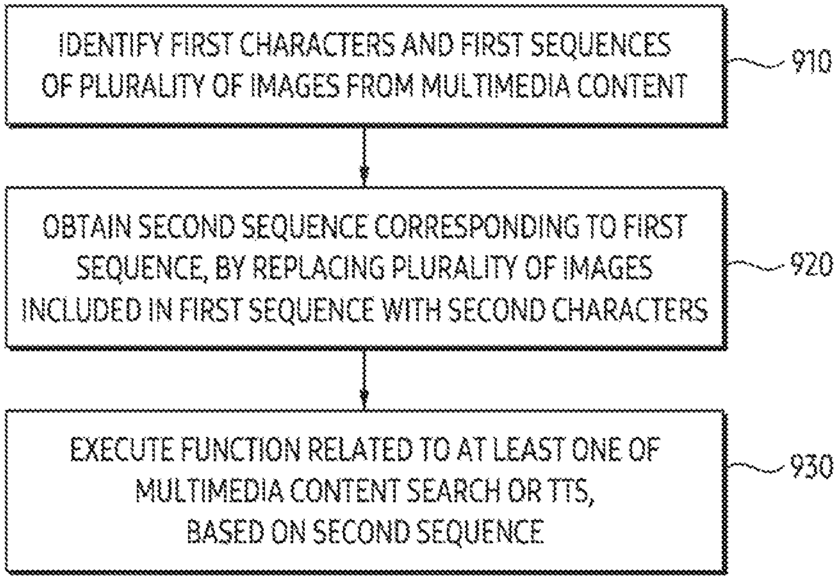
FIG. 9 illustrates an example of a flowchart for describing an operation performed by an electronic device, according to an embodiment.

FIG. 9 illustrates an example of a flowchart for describing an operation performed by an electronic device, according to an embodiment. The electronic device of FIG. 9 may include the electronic device 101 of FIGS. 1 to 7. The operations of FIG. 9 may be performed by the electronic device 101 of FIGS. 3 to 4 and/or the processor 120 of FIG. 3. The operations of FIG. 9 may be related to at least one of the operations of FIG. 8. In the following embodiment, each operation may be performed sequentially, but is not necessarily performed sequentially. For example, the order of each operation may be changed, and at least two operations may be performed in parallel.

Referring to FIG. 9, in operation 910, according to an embodiment, the electronic device may identify first characters and first sequences of a plurality of images from the multimedia content. The multimedia content of FIG. 9 may include at least one message (e.g., messages 621, 622, 623, 624, 625, 626, 627) displayed by the multimedia content 210 of FIGS. 2, 4 to 5, and/or the messenger application of FIGS. 6 to 7.

Referring to FIG. 9, in operation 920, according to an embodiment, the electronic device may obtain a second sequence corresponding to the first sequence, by replacing a plurality of images included in the first sequence with second characters. The electronic device may obtain an implicit representation for the second sequence, such as the multimodal information 414 of FIG. 4. The second characters may include one or more words and/or phrase representing contextual meaning of each of the plurality of images in the first sequence.

Referring to FIG. 9, in operation 930, according to an embodiment, the electronic device may execute a function related to at least one of multimedia content search or TTS, based on the second sequence of operation 920. For example, the electronic device 101 may search at least one character included in the speech within the second sequence, in response to user's speech (e.g., the speeches 220, 240 in FIG. 2) for searching multimedia content. Similar to operation 830 of FIG. 8, the electronic device 101 may output a result of searching for at least one character in the second sequence through a speaker or a display. For example, the electronic device 101 may execute TTS function for at least one portion of the second sequence, in response to an input indicating to select the option 714 of FIG. 7.

Figure 10:
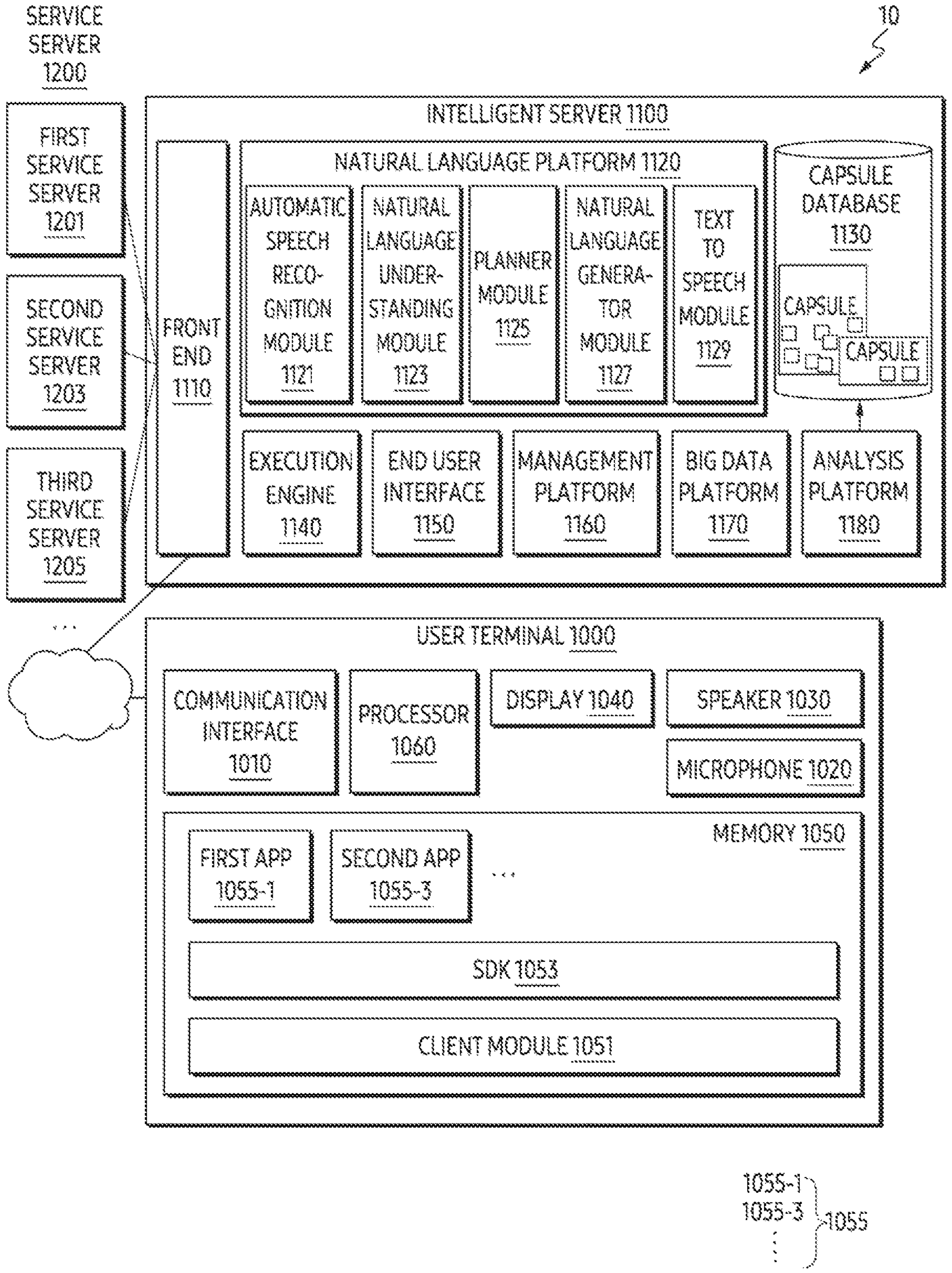
FIG. 10 illustrates an integrated artificial intelligence (AI) system according to an embodiment.

FIG. 10 is a block diagram illustrating an integrated artificial intelligence (AI) system according to an embodiment.

Referring to FIG. 10, an integrated artificial intelligence system 10 according to an embodiment may include a user terminal 1000, an intelligent server 1100, and a service server 1200.

The user terminal 1000 (e.g., the electronic device 101 of FIG. 1) according to an embodiment may be a terminal device (or electronic device) connectable to the Internet, and for example, it may be mobile phone, smartphone, personal digital assistant (PDA), laptop computer, TV, white goods, wearable device, HMD, or a smart speaker.

According to an embodiment, the user terminal 1000 may include a communication interface 1010, a microphone 1020, a speaker 1030, a display 1040, a memory 1050, and a processor 1060. The components listed above may be operably or electrically connected to each other.

According to an embodiment, the communication interface 1010 may be configured to be connected to an external device to transmit and receive data. According to an embodiment, the microphone 1020 may receive sound (e.g., user speech) and convert it into an electrical signal. According to an embodiment, the speaker 1030 may output an electrical signal as sound (e.g., voice). According to an embodiment, the display 1040 may be configured to display an image or video. According to an embodiment, the display 1040 may display a graphic user interface (GUI) of an app (or application program) being executed.

The display 1040 according to an embodiment may be configured to display an image or video. The display 1040 according to an embodiment may also display the graphic user interface (GUI) of an app (or application program) being executed. The display 1040 according to an embodiment may receive a touch input through a touch sensor. For example, the display 1040 may receive a text input through a touch sensor in image keyboard area displayed in the display 1040.

According to an embodiment, the memory 1050 may store a client module 1051, a software development kit (SDK) 1053, and a plurality of apps 1055. The client module 1051 and the SDK 1053 may comprise a framework (or solution program) to perform general functions. In addition, the client module 1051 or the SDK 1053 may comprise a framework for processing user input (e.g., voice input, text input, touch input).

According to an embodiment, the plurality of apps 1055 may be programs for performing a designated function. According to an embodiment, a plurality of apps 1055 may include a first app 1055_1 and a second app 1055_3. According to an embodiment, each of the plurality of apps 1055 may include a plurality of operations for performing a designated function. For example, the plurality of apps 1055 may include at least one of alarm app, message app, and schedule app. According to an embodiment, the plurality of apps 1055 may be executed by the processor 1060 to sequentially execute at least portion of the plurality of operations.

According to an embodiment, the processor 1060 may control overall operation of the user terminal 1000. For example, the processor 1060 can be electrically connected to the communication interface 1010, the microphone 1020, the speaker 1030, the display 1040, and the memory 1050 to perform a designated operation.

According to an embodiment, the processor 1060 may also execute a program stored in the memory 1050 to perform a designated function. For example, the processor 1060 may execute at least one of the client module 1051 or the SDK 1053 to perform the following operations to process user input. For example, the processor 1060 may control operations of the plurality of apps 1055 through the SDK 1053. The following operations described as operations of the client module 1051 or the SDK 1053 may be operation by execution of the processor 1060.

According to an embodiment, the client module 1051 may receive a user input. For example, the client module 1051 may generate a voice signal corresponding to a user speech detected through the microphone 1020. Alternatively, the client module 1051 may receive a touch input detected through the display 1040. Alternatively, the client module 1051 may receive a text input detected through a keyboard or an image keyboard. In addition, the client module 1051 may receive various types of user input detected through an input module included in the user terminal 1000 or an input module connected to the user terminal 1000. The client module 1051 may transmit the received user input to the intelligent server 1100. According to an embodiment, the client module 1051 may transmit state information of the user terminal 1000 to the intelligent server 1100 together with the received user input. For example, the state information may be execution state information of an app.

According to an embodiment, the client module 1051 may receive a result corresponding to the received user input. For example, the client module 1051 may receive a result corresponding to a user input from the intelligent server 1100. The client module 1051 may display the received result on the display 1040. In addition, the client module 1051 may output the received result as audio through the speaker 1030.

According to an embodiment, the client module 1051 may receive a plan corresponding to the received user input. The client module 1051 may display a result of executing a plurality of operations of an app according to the plan on the display 1040. For example, the client module 1051 may sequentially display the execution results of the plurality of operations on the display and output audio through the speaker 1030. For another example, the user terminal 1000 may display a portion of result (e.g., the result of the last operation) of executing the plurality of operations on the display, and output audio through the speaker 1030.

According to an embodiment, the client module 1051 may receive a request for obtaining information necessary to calculate a result corresponding to a user input from the intelligent server 1100. For example, information required to calculate the result may be state information of the user terminal 1000. According to an embodiment, the client module 1051 may transmit the necessary information to the intelligent server 1100 in response to the request.

According to an embodiment, the client module 1051 may transmit result information executing a plurality of operations according to a plan to the intelligent server 1100. The intelligent server 1100 may identify that the user input received through the result information is correctly processed.

According to an embodiment, the client module 1051 may include a voice recognition module. According to an embodiment, the client module 1051 may recognize a voice input performing a limited function through the voice recognition module. For example, the client module 1051 may perform an intelligent app to process voice input for performing organic operations through a designated input (e.g., wake up!).

According to an embodiment, the intelligent server 1100 may receive information related to a user voice input from the user terminal 1000 through a communication network. According to an embodiment, the intelligent server 1100 may change data related to the received voice input into text data. According to an embodiment, the intelligent server 1100 may generate a plan for performing a task corresponding to a user voice input based on the text data.

According to an embodiment, the plan may be generated by an AI system. The AI system may be a rule-based system, or a neural network-based system (e.g., feedforward neural network (FNN), or recurrent neural network (RNN)). Alternatively, it may be a combination of the described above or an artificial intelligence system different therefrom. According to an embodiment, a plan may be selected from a set of predefined plans or may be generated in real time in response to a user request. For example, the AI system may select at least one plan from a plurality of predefined plans.

According to an embodiment, the intelligent server 1100 may transmit a result calculated according to the generated plan to the user terminal 1000 or transmit the generated plan to the user terminal 1000. According to an embodiment, the user terminal 1000 may display a result calculated according to a plan on a display. According to an embodiment, the user terminal 1000 may display a result of executing an operation according to a plan on a display.

The intelligent server 1100 according to an embodiment may include a front end 1110, a natural language platform 1120, a capsule DB 1130, an execution engine 1140, an end user interface 1150, a management platform 1160, a big data platform 1170, and an analysis platform 1180.

According to an embodiment, the front end 1110 may receive a user input received from the user terminal 1000. The front end 1110 may transmit a response corresponding to the user input.

According to an embodiment, the natural language platform 1120 may include an automatic speech recognition module (ASR module) 1121, a natural language understanding module (NLU module) 1123, a planner module 1125, a natural language generator module (NLG module) 1127, and a text to speech module (TTS module) 1129.

According to an embodiment, the automatic speech recognition module 1121 may convert a voice input received from the user terminal 1000 into text data. According to an embodiment, the natural language understanding module 1123 may understand a user's intention using text data of a voice input. For example, the natural language understanding module 1123 may perform syntactic analyze or semantic analyze on user input in a form of text data to understand the user's intention. According to an embodiment, the natural language understanding module 1123 may understand the meaning of words extracted from user input by using linguistic features (e.g., grammatical elements) of morphemes or phrases, and determine user's intention by matching the meaning of the identified word to the intention. The natural language understanding module 1123 may obtain intent information corresponding to user speech. The intent information may be information indicating a user's intention determined by interpreting text data. The intent information may include information indicating an operation or function that the user wants to execute using the device.

According to an embodiment, the planner module 1125 may generate a plan by using intention and parameter determined by the natural language understanding module 1123. According to an embodiment, the planner module 1125 may determine a plurality of domains necessary to perform a task based on the determined intention. The planner module 1125 may determine a plurality of operations included in each of the plurality of domains determined based on the intention. According to an embodiment, the planner module 1125 may determine a parameter required to execute the plurality of determined operations or a result value outputted by the execution of the plurality of operations. The parameter and the result value may be defined as a concept related to a designated format (or class). Accordingly, the plan may include a plurality of operations and a plurality of concepts determined by the intention of the user. The planner module 1125 may determine a relationship between the plurality of operations and the plurality of concepts in stages (or hierarchical). For example, the planner module 1125 may determine execution order of a plurality of operations determined based on the user's intention, based on a plurality of concepts. In other words, the planner module 1125 may determine execution order of plurality of operations, based on a parameter required for the execution of the plurality of operations and a results outputted by the execution of the plurality of operations. Accordingly, the planner module 1125 may generate a plan including association information (e.g., ontology) between the plurality of operations and the plurality of concepts. The planner module 1125 may generate a plan by using information stored in the capsule database 1130 where a set of relationships between concept and operation is stored.

According to an embodiment, the natural language generation module 1127 may change a designated information into text form. The information changed to text form may be a form of natural language speech. The text voice conversion module 1129 according to an embodiment may change text-type information into voice-type information.

According to an embodiment, the capsule database 1130 may store information on a relationship between a plurality of concepts corresponding to a plurality of domains and operations. For example, the capsule database 1130 may store a plurality of capsules including a plurality of action object (or action information) and concept object (or concept information) of the plan. According to an embodiment, the capsule database 1130 may store the plurality of capsules in a form of a concept action network (CAN). According to an embodiment, a plurality of capsules may be stored in a function registry included in the capsule database 1130.

According to an embodiment, the capsule database 1130 may include a strategy registry in which strategy information required when determining a plan corresponding to a voice input is stored. The strategy information may include reference information for determining one plan when a plurality of plans corresponding to a user input exists. According to an embodiment, the capsule database 1130 may include a follow-up registry in which information on a follow-up operation for proposing a follow-up operation to the user in a designated situation is stored. The follow-up may include, for example, follow-up speech. According to an embodiment, the capsule database 1130 may include a layout registry for storing layout information of information outputted through the user terminal 1000. According to an embodiment, the capsule database 1130 may include a vocabulary registry in which vocabulary information included in capsule information is stored. According to an embodiment, the capsule database 1130 may include a dialog registry in which dialog (or interaction) information with a user is stored.

According to an embodiment, the capsule database 1130 may update an object stored through a developer tool. For example, the developer tool may include a function editor for updating an action object or concept object. The developer tool may include a vocabulary editor for updating a vocabulary. The developer tool may include a strategy editor that generates and registers a strategy for determining a plan. The developer tool may include a dialog editor that generates a dialog with a user. The developer tool may include a follow-up editor activating subsequent goal and editing subsequent speech that provide hints. The subsequent goal may be determined based on a currently set goal, user preference, or environmental condition.

According to an embodiment, the capsule database 1130 may also be implemented in the user terminal 1000. In other words, the user terminal 1000 may include a capsule database 1130 storing information for determining an operation corresponding to a voice input.

According to an embodiment, the execution engine 1140 may calculate a result by using the generated plan. According to an embodiment, the end user interface 1150 may transmit the calculated result to the user terminal 1000. Accordingly, the user terminal 1000 may receive the result and provide the received result to the user. According to an embodiment, the management platform 1160 may manage information used in the intelligent server 1100. According to an embodiment, the big data platform 1170 may collect user data. According to an embodiment, the analysis platform 1180 may manage a quality of service (QoS) of the intelligent server 1100. For example, the analysis platform 1180 may manage components and processing speed (or efficiency) of the intelligent server 1100.

According to an embodiment, the service server 1200 may provide a designated service (e.g., food order or hotel reservation) to the user terminal 1000. According to an embodiment, the service server 1200 may be a server operated by a third party. For example, the service server 1200 may include a first service server 1201, a second service server 1203, and a third service server 1205 operated by different third parties. According to an embodiment, the service server 1200 may provide information for generating a plan corresponding to the received voice input to the intelligent server 1100. For example, the provided information may be stored in the capsule database 1130. In addition, the service server 1200 may provide result information according to the plan to the intelligent server 1100.

In the integrated intelligence system 10 described above, the user terminal 1000 may provide various intelligent services to the user in response to user input. For example, the user input may include an input through a physical button, a touch input, or a voice input.

According to an embodiment, the user terminal 1000 may provide a voice recognition service through an intelligent app (or a voice recognition app) stored therein. In this case, for example, the user terminal 1000 may recognize the user's utterance or voice input received through the microphone and provide a service corresponding to the recognized voice input to the user.

According to an embodiment, the user terminal 1000 may perform a designated operation alone or with the intelligent server and/or service server, based on the received voice input. For example, the user terminal 1000 may execute an app corresponding to the received voice input and perform a designated operation through the executed app.

According to an embodiment, when the user terminal 1000 provides a service together with the intelligent server 1100 and/or the service server, the user terminal may detect a user's utterance using the microphone 1020 and generate a signal (or voice data) corresponding to the detected user's utterance. The user terminal may transmit the voice data to the intelligent server 1100 by using the communication interface 1010.

According to an embodiment, the intelligent server 1100 may generate a plan for performing a task corresponding to the voice input or a result of performing an operation according to the plan, in response to the voice input received from the user terminal 1000. For example, the plan may include a plurality of operations for performing a task corresponding to the user's voice input and a plurality of concepts related to the plurality of operations. The concept may define a parameter to be inputted to the execution of the plurality of operations or result values to be outputted by the execution of the plurality of operations. The plan may include association information between the plurality of operations and the plurality of concepts.

The user terminal 1000 according to an embodiment may receive the response using the communication interface 1010. The user terminal 1000 may output a voice signal generated inside the user terminal 1000 to the outside by using the speaker 1030, or may output an image generated inside the user terminal 1000 to the outside by using the display 1040.

Figure 11:
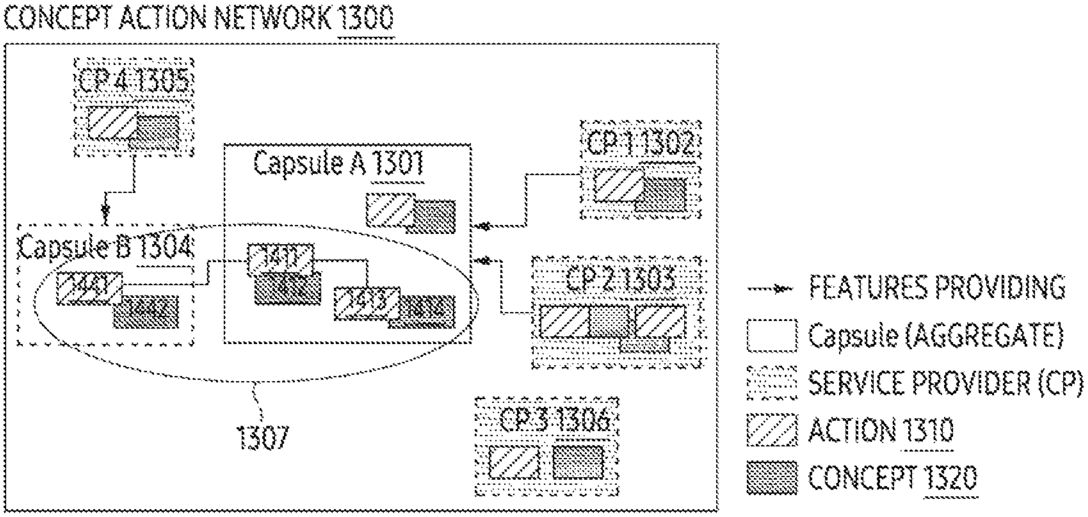
FIG. 11 illustrates a form in which relationship information between a concept and an action is stored in a database, according to an embodiment.

FIG. 11 is a diagram illustrating a form in which relationship information between a concept and an action is stored in a database, according to an embodiment.

The capsule database (e.g., the capsule database 1130 of FIG. 10) of the intelligent server (e.g., the intelligent server 1100 of FIG. 10) may store a plurality of capsules in a form of a concept action network (CAN) 1300. The capsule database may store an operation for processing a task corresponding to a user's voice input and a parameter necessary for the operation in a form of the CAN. The CAN may represent an organic relationship between an action and a concept defining a parameter required to perform the action.

The capsule database may store a plurality of capsules (e.g., Capsule A 1301, Capsule B 1304) corresponding to each of a plurality of domains (e.g., application). According to an embodiment, one capsule (e.g., Capsule A 1301) may correspond to one domain (e.g., application). In addition, one capsule may correspond to at least one service provider (e.g., CP 1 1302, CP 2 1303, CP 3 1306, or CP 4 1305) to perform a function of the domain related to the capsule. According to an embodiment, one capsule may include at least one operation 1310 and at least one concept 1320 for performing a designated function.

According to an embodiment, a natural language platform (e.g., the natural language platform 1120 of FIG. 10) may generate a plan for performing a task corresponding to the received voice input using a capsule stored in the capsule database. For example, a planner module (e.g., the planner module 1125 in FIG. 10) of the natural language platform may generate a plan by using a capsule stored in the capsule database. For example, a plan 1307 may be generated by using the operations 1411 and 1413 and concepts 1412 and 1414 of the Capsule A 1301, and operations 1441 and concepts 1442 of the Capsule B 1304.

Figure 12:
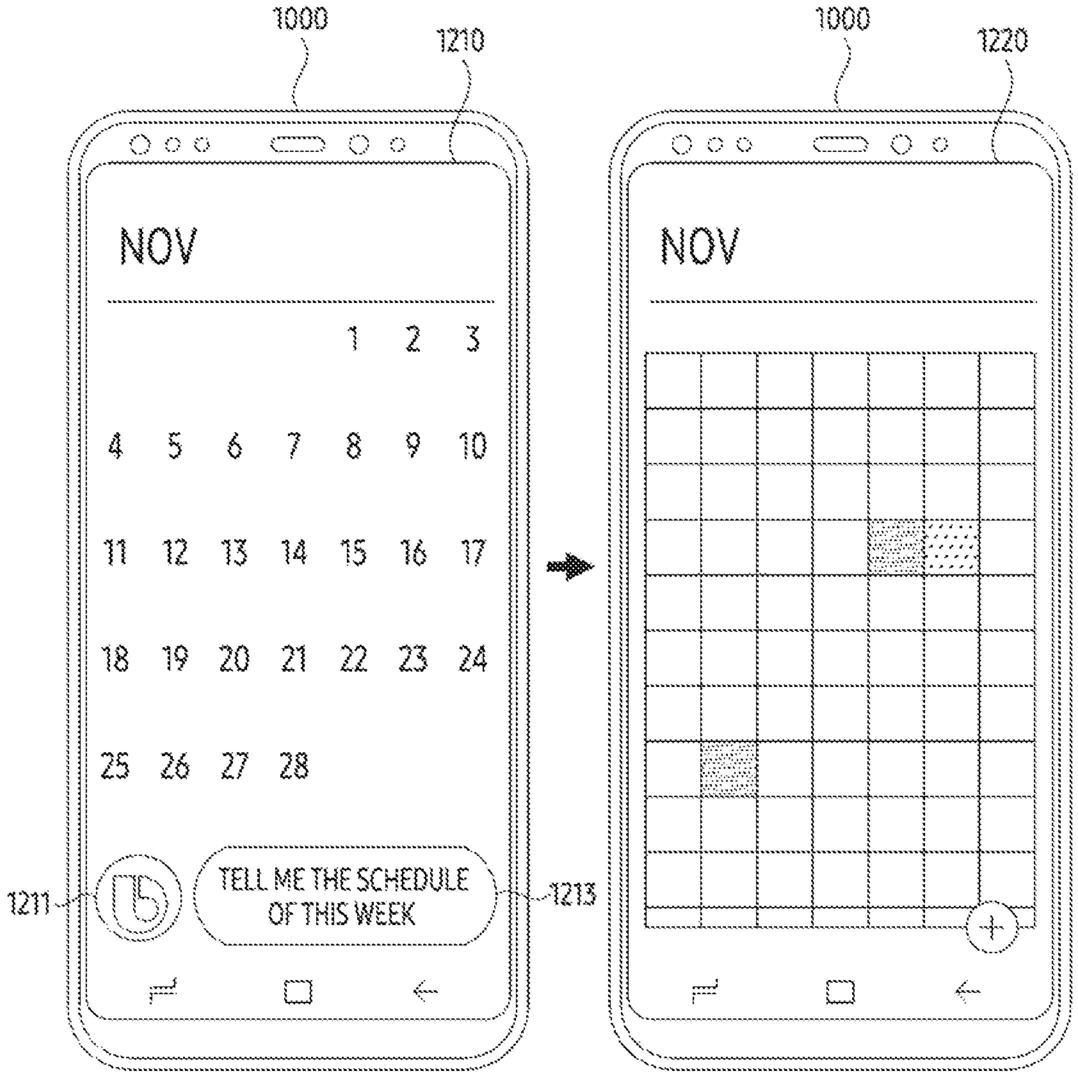
FIG. 12 is a diagram illustrating a user terminal that displays a screen for processing a voice input received through an intelligent app, according to an embodiment.

FIG. 12 is a diagram illustrating a user terminal that displays a screen for processing a voice input received through an intelligent app, according to an embodiment.

The user terminal 1000 may execute an intelligent app for processing a user input through an intelligent server (e.g., the intelligent server 1100 of FIG. 12).

According to an embodiment, in the screen 1210, the user terminal 1000 may execute an intelligent app for processing the voice input when recognizing a designated voice input (e.g., wake up!) or receiving an input through a hardware key (e.g., a dedicated hardware key). For example, the user terminal 1000 may execute an intelligent app in a state of executing a schedule app. According to an embodiment, the user terminal 1000 may display an object (e.g., icon) 1211 corresponding to an intelligent app on a display (e.g., the display 1040 of FIG. 10). According to an embodiment, the user terminal 1000 may receive a voice input by a user utterance. For example, the user terminal 1000 may receive a voice input saying, "Tell me the schedule of this week!". According to an embodiment, the user terminal 1000 may display a user interface (UI) 1213 (e.g., an input window) of an intelligent app in which text data of the received voice input is displayed on the display.

According to an embodiment, on screen 1220, the user terminal 1000 may display a result corresponding to the received voice input on the display. For example, the user terminal 1000 may receive a plan corresponding to the received user input and display 'schedule of this week' on the display according to the plan.

A method for an electronic device to utilize images (e.g., icon, and/or special characters) embedded in text in a search may be required. According to an embodiment, an electronic device (e.g., the electronic device 101 in FIGS. 3 to 4) may include a speaker (e.g., the speaker 310 in FIG. 3), a display (e.g., the display 260 in FIG. 3), a memory (e.g., the memory 130 of FIG. 3) and a processor (e.g., the processor 120 of FIG. 3). The processor may be configured to identify an input indicating to search a multimedia content (e.g., the multimedia content 210 of FIG. 2) stored in the memory and including a combination of first text and a plurality of images. The processor may be configured to identify, in response to the input, based on the first text, and second text representing the plurality of images, a portion of the multimedia content matched to third text included in the input. The processor may be configured to output, by controlling at least one of the speaker or the display, the portion of the multimedia content matched to the third text. According to an embodiment, the electronic device may search multimedia content by using the contextual meaning of the plurality of images, within a combination of text and a plurality of images included in multimedia content.

For example, the processor may be configured to output audio signal including speeches (e.g., the speeches 230 and 250 of FIG. 2) representing, among the plurality of images, at least one image included in the portion of the multimedia content based on the second text, through the speaker.

For example, the processor may be configured to identify, in a sequence of characters included in the first text, positions where each of the plurality of images is located. The processor may be configured to obtain the second text based on at least one character respectively corresponding to the plurality of images based on the identified positions.

For example, the processor may be configured to identify the portion based on the second text including semantic expression of which each of the plurality of images in the sequence.

For example, the processor may be configured to combine the first text and the second text based on the positions in the sequence. The processor may be configured to identify, based on the combination of the first text and the second text, the portion of the multimedia content matched to the third text.

For example, the electronic device may include a communication circuit (e.g., the communication circuit 330 of FIG. 3). The processor may be configured to store, based on receiving the multimedia content through the communication circuit, the multimedia content in the memory.

For example, the electronic device may include a microphone (e.g., the microphone 320 of FIG. 3). For example, the processor may be configured to identify the input including the third text based on speech included in audio signal received through the microphone.

For example, the processor may be configured to display the portion matched to the third text by scrolling the combination of the first text and the plurality of images indicated by the multimedia content in the display.

For example, the processor may be configured to Identify, in the multimedia content, the combination of the first text and the plurality of images based on a plurality of codes representing the plurality of images based on text format.

For example, the processor may be configured to display the portion of the multimedia content to be displayed through the display based on a combination of the first text and the second text.

According to an embodiment, a method of an electronic device may include identifying, an input indicating to search multimedia content including a first sequence of first characters and a plurality of images. The method may include identifying, in response to the input, based on a second sequence which is obtained by replacing the plurality of images in the first sequence to a second characters representing the plurality of images, a portion of the second sequence matched to one or more third characters included in the input. The method may include outputting, the portion of the second sequence as a response to the input.

For example, the identifying the portion may include identifying at least one character corresponding to each of the plurality of images among the first characters based on the first sequence. The identifying the portion may include identifying the second characters representing the plurality of images based on the identified at least one character.

For example, the identifying the second characters may include identifying the second characters including semantic expression of which the plurality of images in the first sequence based on the at least one character corresponding to each of the plurality of images.

For example, the identifying the input may include identifying the input including the one or more third characters based on audio signal received through a microphone in the electronic device.

For example, the outputting the portion of the second sequence may include outputting audio signal including speech representing at least one image corresponding to the portion of the second sequence among the plurality of images through a speaker in the electronic device.

For example, the outputting the portion of the second sequence may include displaying, in a state outputting the portion of the second sequence through a display in the electronic device, an image matched to at least one character included in the portion of the second sequence in the display.

According to an embodiment, a method of an electronic device may include identifying (e.g., operation 810 of FIG. 8) an input indicating to search a multimedia content stored in a memory of the electronic device and including a combination of first text and a plurality of images. The method may include identifying (e.g., operation 820 of FIG. 8), in response to the input, based on the first text, and second text representing the plurality of images, a portion of the multimedia content matched to third text included in the input. The method may include outputting (e.g., operation 810 of FIG. 8) by controlling at least one speaker of the electronic device or a display of the electronic device, the portion of the multimedia content matched to the third text.

For example, the outputting may include outputting audio signal including a speech representing, among the plurality of images, at least one image included in the portion of the multimedia content based on the second text through the speaker.

For example, the method may include identifying, in sequence of characters included in the first text, positions where each of the plurality of images is located. The method may include obtaining, based on identified positions, the second text based on at least one character corresponding to each of the plurality of images.

For example, the identifying a portion of the multimedia content may include identifying the portion based on the second text including semantic expression of the plurality of images in the sequence.

According to an embodiment, an electronic device (e.g., the electronic device 101 in FIGS. 3 to 4) may include a speaker (e.g., the speakers 310 in FIG. 3) and a processor (e.g., the processors 120 in FIG. 3). The processor may be configured to identify an input indicating to search multimedia content (e.g., the multimedia content 210 of FIG. 2) including first sequence of a first characters and a plurality of images. For example, the processor may be configured to identify, in response to the input, based on a second sequence which is obtained by replacing the plurality of images in the first sequence to a second characters representing the plurality of images, a portion of the second sequence matched to one or more third characters included in the input. For example, the processor may be configured to output, through the speaker, the portion of the second sequence as a response to the input.

For example, the processor may be configured to identify, based on the first sequence, at least one character corresponding to each of the plurality of images among the first characters. The processor may be configured to identify, based on the identified at least one character, the second characters representing the plurality of images.

For example, the processor may be configured to identify, based on the at least one character corresponding to each of the plurality of images, the second characters including semantic expression of the plurality of images in the first sequence.

For example, the electronic device may include a microphone. The processor may be configured to identify, based on audio signal received through the microphone, the input including the one or more third characters.

For example, the processor may be configured to output, through the speaker, audio signal including speech representing, among the plurality of images, at least one image corresponding to the portion of the second sequence.

According to an embodiment, an electronic device may includes a speaker; a display; a memory; and a processor operatively connected to the speaker, the display, and the memory. The processor may configured to identify an input indicating to search a multimedia content stored in the memory. The multimedia content may comprises a first text and a plurality of images. The input may comprises a third text. The processor may configured to generate a second text representing the plurality of images. The processor may configured to identify, based on the first text and the second text, a portion of the multimedia content, which is matched to the third text. The processor may configured to output, via at least one of the speaker or the display, the portion of the multimedia content.

For example, the processor may configured to output an audio signal through the speaker. The audio signal may comprises a speech representing, based on the second text, at least one image of the portion of the multimedia content.

For example, the first text may comprises a sequence of characters. The processor may configured to identify, in the sequence of characters of the first text, a position at which each of the plurality of images is located. The processor may configured to obtain the second text based on at least one character respectively corresponding to the plurality of images based on the identified position.

For example, the processor may configured to identify the portion of the multimedia content, based on the second text comprising a semantic expression respectively corresponding to each of the plurality of images.

For example, the processor may configured to combine the first text and the second text, based on the position in the sequence of characters of the first text. The processor may configured to identify, based on the first text and the second text, the portion of the multimedia content, which is matched to the third text.

For example, the electronic device may comprise a communication circuit configured to receive the multimedia content. The processor may configured to wtore the multimedia content in the memory.

For example, the electronic device may comprise a microphone configured to receive an audio signal. The processor may configured to identify the input based on a speech of the audio signal.

For example, the processor may configured to display, in the display, the portion of the multimedia content by scrolling the first text and the plurality of images.

For example, the processor may configured to identify, in the multimedia content, the first text and the plurality of images based on a plurality of codes representing the plurality of images. The plurality of codes is based on a text format.

For example, the processor may configured to display, through the display, the portion of the multimedia content, based on the first text and the second text.

According to an embodiment, a method of an electronic device, may comprises identifying, an input indicating to search a multimedia content comprising a first sequence of first characters and a plurality of images. The input may comprises one or more third characters. The method may comprises identifying, based on a second sequence of second characters, which is obtained by replacing the plurality of images with the second characters representing the plurality of images, a portion of the second sequence matched to the one or more third characters. The method may comprises outputting, the portion of the second sequence of the second characters as a response to the input.

For example, the identifying the portion of the second sequence of the second characters may comprises identifying at least one character respectively corresponding to each of the plurality of images among the first characters based on the first sequence. The identifying the portion of the second sequence of the second characters may comprises identifying the second characters representing the plurality of images based on the identified at least one character.

For example, the identifying the second characters may comprises identifying the second characters comprising semantic expressions corresponding to the plurality of images, based on the at least one character corresponding to each of the plurality of images.

For example, the identifying the input may comprises identifying the input comprising the one or more third characters based on an audio signal received via a microphone of the electronic device.

For example, the outputting the portion of the second sequence may comprises outputting an audio signal comprising a speech representing at least one image corresponding to the portion of the second sequence among the plurality of images, via a speaker of the electronic device.

For example, the outputting the portion of the second sequence may comprises displaying, in a state outputting the portion of the second sequence through a display of the electronic device, an image matched to at least one character of the portion of the second sequence, on the display.

According to an embodiment, a method of an electronic device, the method may comprises identifying an input indicating to search a multimedia content stored in a memory of the electronic device. The multimedia content may comprises a first text and a plurality of images. The input may comprises a third text. The method may comprises identifying, based on the first text and second text representing the plurality of images, a portion of the multimedia content, which is matched to the third text. The method may comprises outputting, via at least one speaker of the electronic device or a display of the electronic device, the portion of the multimedia content.

For example, the outputting may comprises outputting, via the speaker, an audio signal comprising a speech representing, among the plurality of images, at least one image of the portion of the multimedia content based on the second text.

For example, the method may comprises identifying, in a sequence of characters of the first text, positions at which each of the plurality of images is located. The method may comprises obtaining the second text, based on the identified positions and based on at least one character respectively corresponding to each of the plurality of images.

For example, the identifying a portion of the multimedia content may comprises identifying the portion based on the second text comprising semantic expressions of the plurality of images.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), programmable logic unit (PLU), microprocessor, any other device capable of executing and responding to instructions. The processing device may perform an operating system OS and one or more software applications performed on the operating system. In addition, the processing device may access, store, manipulate, process, and generate data in response to execution of the software. Although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMS, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. An electronic device comprising:

a speaker;

a display;

memory including one or more storage media storing instructions; and at least one processor including processing circuitry, wherein the instructions, when executed by the at least one processor individually or collectively, cause the electronic device to:

identify an input for searching a first set of contents stored in the memory, wherein the first set of contents include a first content including a first image and a second content including the first image;

in response to the input, identify a second set of contents in which an image included in the first set of contents is replaced with at least one text, wherein the second set of contents include a third content corresponding to the first content in which the first image is replaced with a first text, and a fourth content corresponding to the second content in which the first image is replaced with a second text;

identify at least portion of the second set of contents, which corresponds to a third text associated with the input; and output, via at least one of the speaker or the display, the at least portion of the second set of contents.

2. The electronic device of claim 1, wherein the instructions, when executed by the at least one processor individually or collectively, cause the electronic device to:

output an audio signal through the speaker, wherein at least portion of the audio signal represents the first text or the second text.

3. The electronic device of claim 1, wherein the first text comprises a sequence of characters, and wherein the instructions, when executed by the at least one processor individually or collectively, cause the electronic device to:

identify, in the sequence of characters of the first content, a position at which the first image is located; and obtain the second text based on at least one character positioned adjacent to the position.

4. The electronic device of claim 3, wherein the instructions, when executed by the at least one processor individually or collectively, cause the electronic device to:

identify the at least portion of the second set of contents, based on the second text comprising a semantic expression of the first image included in the first content.

5. The electronic device of claim 3, wherein the instructions, when executed by the at least one processor individually or collectively, cause the electronic device to:

combine the second text and the sequence of characters of the first content, based on the position;

identify, based on the third content including the combined second text with respect to the sequence of characters, the at least portion of the second set of contents, which corresponds to the third text.

6. The electronic device of claim 1, further comprising a communication circuit configured to receive second multimedia content, wherein the instructions, when executed by the at least one processor individually or collectively, cause the electronic device to store the second set of contents in the memory.

7. The electronic device of claim 1, further comprising a microphone configured to receive an audio signal, wherein the instructions, when executed by the at least one processor individually or collectively, cause the electronic device to identify the input based on a speech of the audio signal.

8. The electronic device of claim 1, wherein the instructions, when executed by the at least one processor individually or collectively, cause the electronic device to display, in the display, a portion of the first set of contents.

9. The electronic device of claim 1, wherein the instructions, when executed by the at least one processor individually or collectively, cause the electronic device to identify, in the first set of contents, the first image included in the first content based on a plurality of codes representing the first image, and wherein the plurality of codes is based on a text format.

10. The electronic device of claim 1, wherein the instructions, when executed by the at least one processor individually or collectively, cause the electronic device to display, through the display, at least portion of the first set of contents corresponding to the at least portion of the second set of contents.

11. A method of an electronic device including a speaker and a display, the method comprising:

identifying an input for searching a first set of contents, wherein the first set of contents include a first content including a first image and a second content including the first image;

in response to the input, identifying a second set of contents in which an image included in the first set of contents is replaced with at least one text, wherein the second set of contents include a third content corresponding to the first content in which the first image is replaced with a first text, and a fourth content corresponding to the second content in which the first image is replaced with a second text;

identifying at least portion of the second set of contents which corresponds to a third text associated with the input; and outputting, via at least one of the speaker or the display, the at least portion of the second set of contents.

12. The method of claim 11, wherein the identifying the second set of contents comprising:

identifying, in a sequence of characters of the first content, a position at which the first image is located; and obtaining the second text based on at least one character positioned adjacent to the position.

13. The method of claim 12, wherein the identifying the second set of contents comprising:

identifying the at least portion of the second set of contents, based on the second text comprising a semantic expressions of the first image included in the first content.

14. The method of claim 11, wherein the identifying the input comprising identifying the input comprising the-one or more third characters based on an audio signal received via a microphone of the electronic device.

15. The method of claim 11, wherein the outputting the at least portion of the second set of contents comprising a speech representing the first text or the second text, via the speaker of the electronic device.

16. The method of claim 11, wherein the outputting the at least portion of the second set of contents comprising displaying, in a state outputting the at least portion of the second set of contents via the speaker of the electronic device, the first image on the display.

17. A method of an electronic device including a memory, a speaker, and a display, the method comprising:

identifying an input for searching a first set of contents stored in the memory of the electronic device, wherein the first set of contents include a first content including a first image and a second content including the first image;

in response to the input, identifying a second set of contents in which an image included in the first set of contents is replaced with at least one text, wherein the second set of contents include a third content corresponding to the first content in which the first image is replaced with a first text, and a fourth content corresponding to the second content in which the first image is replaced with a second text;

identifying at least a portion of the second set of contents, which corresponds to a third text associated with the input; and outputting, via at least one of the speaker or the display, at least portion of the first set of contents corresponding to the identified at least portion of the second set of contents.

18. The method of claim 17, wherein the outputting comprising:

outputting, via the speaker, an audio signal comprising a speech representing the first image of the at least portion of the first set of contents based on the second text.

19. The method of claim 17, further comprising:

identifying, in a sequence of characters of the first text, a position at which the first image is located; and obtaining the second text, based on the identified positions and based on at least one character respectively corresponding to the first image.

20. The method of claim 19, wherein the identifying the portion of the first set of contents comprising identifying the portion based on the second text comprising semantic expressions of the first image.

* * * * *